US011403349B2

(12) United States Patent
Mannar et al.

(10) Patent No.: US 11,403,349 B2
(45) Date of Patent: Aug. 2, 2022

(54) DARK WEB CONTENT ANALYSIS AND IDENTIFICATION

(71) Applicant: ACCENTURE GLOBAL SOLUTIONS LIMITED, Dublin (IE)

(72) Inventors: Kamal Mannar, Singapore (SG); Tau Herng Lim, Singapore (SG); Chun Wei Wu, Singapore (SG); Fransisca Fortunata, Singapore (SG)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 467 days.

(21) Appl. No.: 16/589,962

(22) Filed: Oct. 1, 2019

(65) Prior Publication Data

US 2020/0151222 A1 May 14, 2020

(30) Foreign Application Priority Data

Nov. 9, 2018 (SG) .............................. 10201809997S

(51) Int. Cl.
*G06F 16/951* (2019.01)
*G06N 3/02* (2006.01)
(Continued)

(52) U.S. Cl.
CPC ............. *G06F 16/951* (2019.01); *G06N 3/02* (2013.01); *G06V 30/413* (2022.01); *H04L 63/1425* (2013.01)

(58) Field of Classification Search
CPC ...... G06F 16/951; G06V 30/413; G06N 3/02; H04L 63/1425

(Continued)

(56) References Cited

U.S. PATENT DOCUMENTS

2010/0153440 A1\* 6/2010 Hubert .................... G06F 16/38
707/769
2017/0161336 A1\* 6/2017 Dubey .................... G06N 7/005
(Continued)

FOREIGN PATENT DOCUMENTS

CN    108664894 A   * 10/2018
CN    110287800 A   *  9/2019

OTHER PUBLICATIONS

Al Nabki et al. "Classifying Illegal Activities on Tor Network Based on Web Textual Contents" 2017 In Proceedings of the 15th Conference of the European Chapter of the Association for Computational Linguistics: vol. 1, Long Papers, pp. 35-43 (Year: 2017).*

(Continued)

*Primary Examiner* — Hosain T Alam
*Assistant Examiner* — Robert F May
(74) *Attorney, Agent, or Firm* — Mannava & Kang, P.C.

(57) ABSTRACT

In some examples, dark web content analysis and identification may include ascertaining data that includes text and images, and analyzing the data by performing deep learning based text and image processing to extract text embedded in the images, and deep embedded clustering to generate clusters. Clusters that are to be monitored may be ascertained from the generated clusters. A determination may be made as to whether the ascertained data is sufficient for classification. If so, a deep convolutional generative adversarial networks (DCGAN) based detector may be utilized to analyze further data with respect to the ascertained clusters, and alternatively, a convolutional neural network (CNN) based detector may be utilized to analyze the further data with respect to the ascertained clusters. Based on the analysis of the further data, an operation associated with a website related to the further data may be controlled.

20 Claims, 22 Drawing Sheets

(51) Int. Cl.
*H04L 9/40* (2022.01)
*G06V 30/413* (2022.01)

(58) Field of Classification Search
USPC .......................................................... 707/709
See application file for complete search history.

(56) References Cited

U.S. PATENT DOCUMENTS

2019/0370666 A1* 12/2019 Ros Sanchez ......... G06N 3/084
2020/0019642 A1*  1/2020 Dua ..................... G06N 3/0454
2021/0319098 A1* 10/2021 Pogorelik ................ G06N 5/04

OTHER PUBLICATIONS

Fu et al. "A focused crawler for Dark Web forums", May 11, 2010, Journal of the American Society for Information Science and Technology vol. 61 Issue 6 pp. 1213-1231 (Year: 2010).*
Nishikaze et al. "Large-Scale Monitoring for Cyber Attacks by Using Cluster Information on Darknet Traffic Features", Aug. 10, 2015, Procedia Computer Science vol. 53 pp. 175-182 (Year: 2015).*

* cited by examiner

| Layer (type) | Output Shape | Param # |
| --- | --- | --- |
| conv1 (Conv2D) | (None, 64, 64, 32) | 2432 |
| conv2 (Conv2D) | (None, 32, 32, 64) | 51264 |
| conv3 (Conv2D) | (None, 16, 16, 128) | 204928 |
| conv4 (Conv2D) | (None, 8, 8, 512) | 590336 |
| flatten_1 (Flatten) | (None, 32768) | 0 |
| embedding (Dense) | (None, 50) | 1638450 |
| dense_1 (Dense) | (None, 32768) | 1671168 |
| reshape_1 (Reshape) | (None, 8, 8, 512) | 0 |
| deconv4 (Conv2DTranspose) | (None, 16, 16, 128) | 589952 |
| deconv3 (Conv2DTranspose) | (None, 32, 32, 64) | 204864 |
| deconv2 (Conv2DTranspose) | (None, 64, 64, 32) | 51232 |
| deconv1 (Conv2DTranspose) | (None, 128, 128, 3) | 2403 |

Total params: 5,007,029
Trainable params: 5,007,029
Non-trainable params: 0

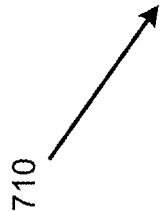

710

Denoising Auto-encoder parameters in Model

```
┌─────────────────────────────────────────────────┐
│   ASCERTAIN DATA THAT INCLUDES TEXT AND IMAGES  │
│                      1602                       │
└─────────────────────────────────────────────────┘
                         │
                         ▼
┌─────────────────────────────────────────────────┐
│ ANALYZE THE ASCERTAINED DATA BY PERFORMING DEEP │
│  LEARNING BASED TEXT AND IMAGE PROCESSING ON    │
│   THE ASCERTAINED DATA TO EXTRACT TEXT          │
│             EMBEDDED IN THE IMAGES              │
│                      1604                       │
└─────────────────────────────────────────────────┘
                         │
                         ▼
┌─────────────────────────────────────────────────┐
│ ANALYZE THE ASCERTAINED DATA BY PERFORMING DEEP │
│ EMBEDDED CLUSTERING WITH RESPECT TO THE         │
│ ASCERTAINED TEXT, THE IMAGES, AND THE TEXT      │
│ EXTRACTED FROM THE IMAGES TO GENERATE A         │
│          PLURALITY OF CLUSTERS                  │
│                      1606                       │
└─────────────────────────────────────────────────┘
                         │
                         ▼
┌─────────────────────────────────────────────────┐
│ TRAIN, BASED ON THE PLURALITY OF GENERATED      │
│ CLUSTERS, A DEEP CONVOLUTIONAL GENERATIVE       │
│ ADVERSARIAL NETWORKS (DCGAN) BASED DETECTOR     │
│ AND A CONVOLUTIONAL NEURAL NETWORK (CNN)        │
│            BASED DETECTOR                       │
│                      1608                       │
└─────────────────────────────────────────────────┘
                         │
                         ▼
┌─────────────────────────────────────────────────┐
│ ASCERTAIN CLUSTERS, FROM THE PLURALITY OF       │
│  GENERATED CLUSTERS, THAT ARE TO BE MONITORED   │
│                      1610                       │
└─────────────────────────────────────────────────┘
                         │
                         ▼
┌─────────────────────────────────────────────────┐
│   ASCERTAIN FURTHER DATA THAT IS TO BE ANALYZED │
│                      1612                       │
└─────────────────────────────────────────────────┘
```

```
┌─────────────────────────────────────────────────────┐
│ DETERMINE WHETHER THE ASCERTAINED DATA IS SUFFICIENT FOR │
│                    CLASSIFICATIONS                   │
│                        1614                          │
└─────────────────────────────────────────────────────┘
                           │
                           ▼
┌─────────────────────────────────────────────────────┐
│ BASED ON A DETERMINATION THAT THE ASCERTAINED DATA IS NOT │
│  SUFFICIENT FOR CLASSIFICATION, UTILIZE THE DCGAN BASED  │
│  DETECTOR TO ANALYZE THE FURTHER DATA WITH RESPECT TO THE │
│                   ASCERTAINED CLUSTERS               │
│                        1616                          │
└─────────────────────────────────────────────────────┘
                           │
                           ▼
┌─────────────────────────────────────────────────────┐
│  BASED ON A DETERMINATION THAT THE ASCERTAINED DATA IS   │
│   SUFFICIENT FOR CLASSIFICATION, UTILIZE THE CNN BASED   │
│  DETECTOR TO ANALYZE THE FURTHER DATA WITH RESPECT TO THE │
│                   ASCERTAINED CLUSTERS               │
│                        1618                          │
└─────────────────────────────────────────────────────┘
                           │
                           ▼
┌─────────────────────────────────────────────────────┐
│  CONTROL, BASED ON THE ANALYSIS OF THE FURTHER DATA, AN  │
│  OPERATION ASSOCIATED WITH A WEBSITE RELATED TO THE FURTHER │
│                          DATA                        │
│                        1620                          │
└─────────────────────────────────────────────────────┘
```

*FIG. 16 (CONT.)*

DARK WEB CONTENT ANALYSIS AND IDENTIFICATION

PRIORITY

The present application claims priority under 35 U.S.C. 119(a)-(d) to Singaporean patent application number 10201809997S, having a filing date of Nov. 9, 2018, the disclosure of which is hereby incorporated by reference in its entirety.

BACKGROUND

The dark web may be described as content that exists on the Internet, but may include limited accessibility that is provided by specialized software, or by the implementation of specialized user authorization. The content may exist on the Internet on overlay networks.

BRIEF DESCRIPTION OF DRAWINGS

Features of the present disclosure are illustrated by way of example and not limited in the following figure(s), in which like numerals indicate like elements, in which:

FIG. 16 illustrates a flowchart of an example method for dark web content analysis and identification in accordance with an example of the present disclosure.

DETAILED DESCRIPTION

Figure 1:
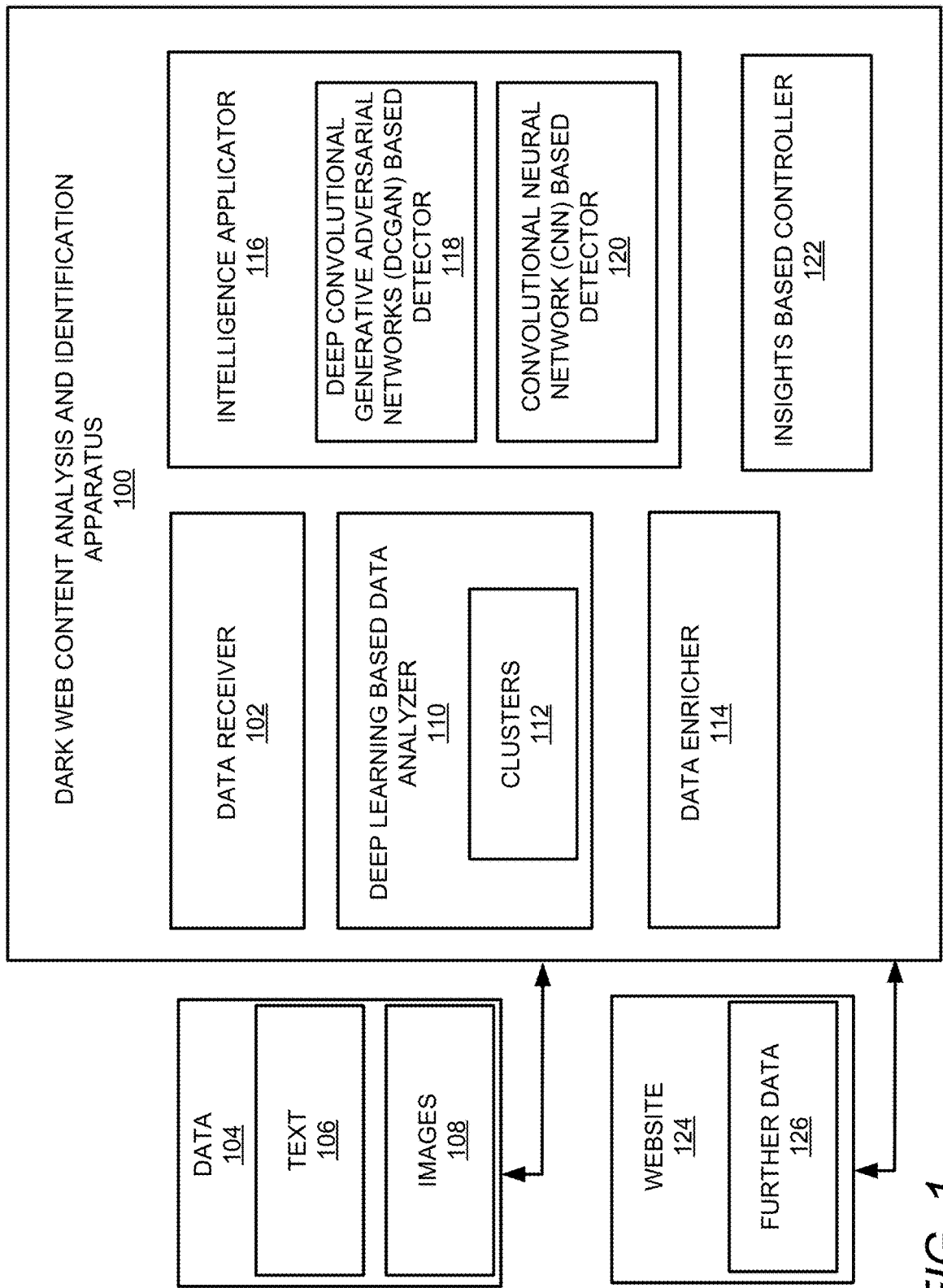
FIG. 1 illustrates a layout of a dark web content analysis and identification apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Dark web content analysis and identification apparatuses, methods for dark web content analysis and identification, and non-transitory computer readable media having stored thereon machine readable instructions to provide dark web content analysis and identification are disclosed herein. The apparatuses, methods, and non-transitory computer readable media disclosed herein may provide for dark web content analysis and identification by ascertaining data that includes text and images. The ascertained data may be analyzed by performing deep learning based text and image processing on the ascertained data to extract text embedded in the images, and deep embedded clustering with respect to the ascertained text, the images, and the text extracted from the images to generate a plurality of clusters. Clusters from the plurality of generated clusters that are to be monitored may be ascertained. Further data that is to be analyzed may be ascertained. A determination may be made as to whether the ascertained data is sufficient for classification. Based on a determination that the ascertained data is not sufficient for classification, a deep convolutional generative adversarial networks (DCGAN) based detector may be utilized to analyze the further data with respect to the ascertained clusters. Alternatively, based on a determination that the ascertained data is sufficient for classification, a convolutional neural network (CNN) based detector may be utilized to analyze the further data with respect to the ascertained clusters. Based on the analysis of the further data, an operation associated with a website related to the further data may be controlled.

The apparatuses, methods, and non-transitory computer readable media disclosed herein provide a technical solution to technical problems related, for example, to surveillance of dark web and open source data sources. In this regard, the apparatuses, methods, and non-transitory computer readable media disclosed herein provide a technical solution of surveillance and/or control of an operation associated with a website, where the website may be part of the dark web and/or open source data sources. For example, the operational control may include blocking access to the website, generating an alert with respect to the website, and/or generating, based on a type and/or a severity of a cluster as disclosed herein, an alert with respect to the website.

With respect to the dark web, according to examples disclosed herein, the apparatuses, methods, and non-transitory computer readable media disclosed herein may implement an unsupervised deep embedded clustering approach that combines information from both text embedded in an image and image content itself in a single modeling approach. The deep embedded clustering approach may combine continuous bag of words (CBOW) embedding based similarity for text with convolutional neural network (CNN) auto encoder similarity for images to identify clusters that are effective in the context of the dark web where some images may include informative text that may be used to better cluster a dataset.

With respect to the dark web, according to examples disclosed herein, the apparatuses, methods, and non-transitory computer readable media disclosed herein may identify images using unsupervised learning to identify, for example, shopfronts that are potentially related based on common images and/or shopfronts that are potentially related based on the design of the shopfront. A shopfront may be described as a webpage display that may be presented to a potential user (e.g., a customer). In this regard, the apparatuses, methods, and non-transitory computer readable media disclosed herein may implement a deep convolutional generative adversarial networks (DCGAN) model to identify potential imitators and/or related websites based on similarity of individual images and/or based on similarity of an organization of a webpage. The DCGAN model may also be referred to hereinafter as the GAN model.

With respect to the dark web, according to examples disclosed herein, the apparatuses, methods, and non-transitory computer readable media disclosed herein may provide for the extraction of intelligence from key images, such as, chemical structures. In this regard, the deep embedded clustering may provide for deep learning based classification, which may be used for image search to identify, for example, chemicals identified in the images. For example, these identified chemicals may indicate precursor chemicals that may be potentially imported.

With respect to the dark web, according to examples disclosed herein, the apparatuses, methods, and non-transitory computer readable media disclosed herein may utilize the outcome of the DCGAN model to generate alerts, for example, for law enforcement agencies.

With respect to the dark web, according to examples disclosed herein, the apparatuses, methods, and non-transitory computer readable media disclosed herein may utilize the outcome of the DCGAN model to control operation of websites (e.g., shutting down a particular website), and/or to control access to websites (e.g., blocking a user, etc.).

With respect to the dark web and agency specific data, according to examples disclosed herein, the apparatuses, methods, and non-transitory computer readable media disclosed herein may provide for matching of images and content (e.g., avatars) identified to dark web data to identify potential sources for illegal content, such as drugs.

With respect to the dark web and agency specific data, according to examples disclosed herein, the apparatuses, methods, and non-transitory computer readable media disclosed herein may utilize a model trained on dark web data to apply on an internal image repository to make the data searchable (e.g., to find all cases where a particular chemical was mentioned either in name or chemical structure).

With respect to the dark web and agency specific data, according to examples disclosed herein, the apparatuses, methods, and non-transitory computer readable media disclosed herein may match identifiable information (e.g., avatars) in an internal repository to dark web data to identify, for example, potential sellers and/or source of illegal content, such as drugs.

According to examples disclosed herein, the apparatuses, methods, and non-transitory computer readable media disclosed herein may be utilized in the area of drug enforcement, where a combination of deep learning models may be used to implement surveillance of dark web and open source data sources.

According to examples disclosed herein, the apparatuses, methods, and non-transitory computer readable media disclosed herein may provide for the extraction of information from unstructured text and images across different sources. In this regard, an agency, such as a drug enforcement agency, may apply the analysis techniques of the apparatuses, methods, and non-transitory computer readable media disclosed herein to investigate and compare data from internal and external sources.

According to examples disclosed herein, the apparatuses, methods, and non-transitory computer readable media disclosed herein may be implemented, for example, for detecting potentially banned chemicals and/or substances or precursor chemicals that may be used to sell the potentially banned substances on the dark web. In this regard, a website may not explicitly name or provide details of what is being sold. However, the website may include images (e.g., chemical structures, pictures of the product etc.) which the deep embedded clustering may map to the same cluster as those websites where the name of the chemical is provided. Alternatively, the chemical structure may be mapped to an in-house database of a proscribed precursor chemical structure. This may facilitate the detection of websites where these chemicals are sold and potentially shipped to a country.

According to examples disclosed herein, the apparatuses, methods, and non-transitory computer readable media disclosed herein may implement deep embedded clustering through its use of text and image data for application to emerging inaccurate news and/or posts to identify all potential sources where inaccurate news and/or posts are being mentioned. As this may be an emerging cluster with insufficient data, DCGAN models may be used to create a more accurate detector to search and find all related posts and/or websites for monitoring and/or action.

According to examples disclosed herein, the apparatuses, methods, and non-transitory computer readable media disclosed herein may provide for detection of imitators and/or multiple storefronts. In this regard, a law enforcement action may lead to sellers of contraband items to create multiple websites using multiple identities to escape detection. The image content (e.g., marketing images, avatars and/or icons, sample images of the product) etc., may be quite similar. In this regard, deep embedded clustering may provide for the identification of these imitators, and alert an agency for appropriate action.

According to examples disclosed herein, the apparatuses, methods, and non-transitory computer readable media disclosed herein may implement unsupervised learning to utilize both text embedded in images and/or the images themselves to cluster the images (and websites) into similar groups. According to an example, this may allow a law enforcement agency to identify which images and/or websites are relevant for their decisions.

According to examples disclosed herein, the apparatuses, methods, and non-transitory computer readable media disclosed herein may generate inference models based on CNN and DCGAN models that may be implemented to generate accurate detectors when a sample size is relatively small to identify future cases of interest, for example, to law enforcement.

According to examples disclosed herein, the apparatuses, methods, and non-transitory computer readable media disclosed herein may provide customizable alerts based on what the inference models to allow, for example, a law enforcement agency to take appropriate action.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example dark web content analysis and identification apparatus (hereinafter also referred to as "apparatus 100").

Referring to FIG. 1, the apparatus 100 may include a data receiver 102 that is executed by at least one hardware processor (e.g., the hardware processor 1502 of FIG. 15, and/or the hardware processor 1704 of FIG. 17) to ascertain data 104 that includes text 106 and images 108.

A deep learning based data analyzer 110 that is executed by at least one hardware processor (e.g., the hardware processor 1502 of FIG. 15, and/or the hardware processor 1704 of FIG. 17) may analyze the ascertained data 104 by performing deep learning based text and image processing on the ascertained data 104 to extract text embedded in the images 108. Further, the deep learning based data analyzer 110 may perform deep embedded clustering with respect to the ascertained text 106, the images 108, and the text extracted from the images 108 to generate a plurality of clusters 112.

According to examples disclosed herein, the deep learning based data analyzer 110 may analyze the ascertained data 104 by performing deep embedded clustering with respect to the ascertained text 106, the images 108, and the text extracted from the images 108 to generate the plurality of clusters 112 by analyzing, for the ascertained text 106 and the text extracted from the images 108, combine continuous bag of words (CBOW) based similarity, and analyzing, for the ascertained images 108, convolutional neural network (CNN) based similarity. Further, the deep learning based data analyzer 110 may generate, based on the CBOW based similarity and the CNN based similarity, the plurality of clusters 112.

A data enricher 114 that is executed by at least one hardware processor (e.g., the hardware processor 1502 of FIG. 15, and/or the hardware processor 1704 of FIG. 17) may ascertain clusters, from the plurality of generated clusters 112, that are to be monitored.

An intelligence applicator 116 that is executed by at least one hardware processor (e.g., the hardware processor 1502 of FIG. 15, and/or the hardware processor 1704 of FIG. 17) may ascertain further data 126 that is to be analyzed. The intelligence applicator 116 may determine whether the ascertained data 104 is sufficient for classification. Based on a determination that the ascertained data 104 is not sufficient for classification, the intelligence applicator 116 may utilize a deep convolutional generative adversarial networks (DCGAN) based detector 118 to analyze the further data 126 with respect to the ascertained clusters. Alternatively, based on a determination that the ascertained data 104 is sufficient for classification, the intelligence applicator 116 may utilize a convolutional neural network (CNN) based detector 120 to analyze the further data 126 with respect to the ascertained clusters.

According to examples disclosed herein, based on the determination that the ascertained data 104 is not sufficient for classification, the intelligence applicator 116 may utilize the DCGAN based detector 118 to analyze the further data 126 with respect to the ascertained clusters by utilizing the DCGAN based detector 118 to analyze the further data 126 with respect to the ascertained clusters to identify a similar source with respect to the further data 126. In this regard, the intelligence applicator 116 may analyze the further data 126 with respect to the ascertained clusters to identify the similar source that includes a similar website with respect to the further data 126. Further, the intelligence applicator 116 may determine the similarity of the similar website with respect to the further data 126 based on a similarity of images included in the similar website, and/or a similarity of an organization of the similar website.

According to examples disclosed herein, based on the determination that the ascertained data 104 is sufficient for classification, the intelligence applicator 116 may utilize the CNN based detector 120 to analyze the further data 126 to score the further data 126.

According to examples disclosed herein, the intelligence applicator 116 may train, based on the plurality of generated clusters 112, the DCGAN based detector 118 to analyze the further data 126 with respect to the ascertained clusters.

According to examples disclosed herein, the intelligence applicator 116 may train, based on the plurality of generated clusters, the CNN based detector 120 to analyze the further data 126 with respect to the ascertained clusters.

Figure 15:
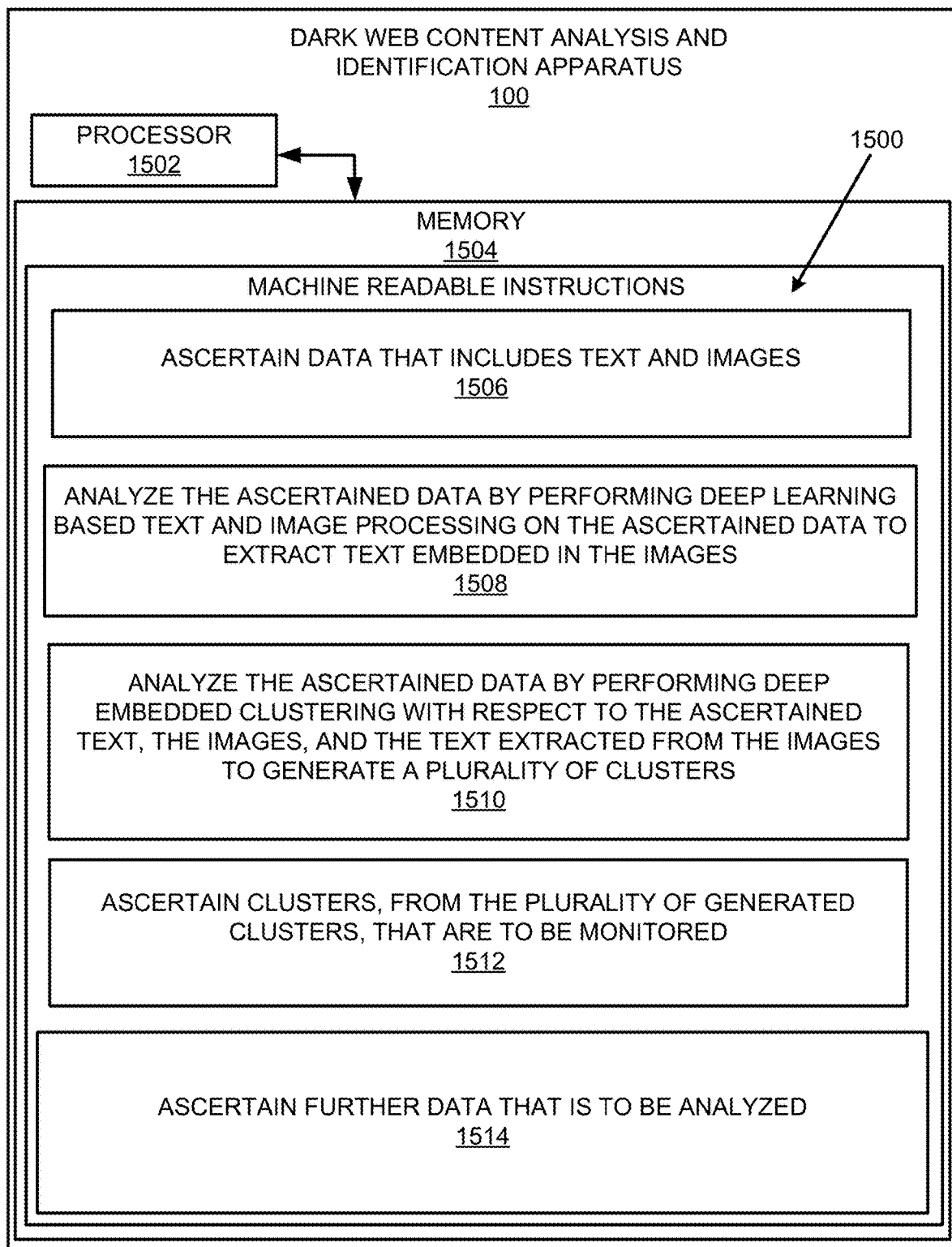
FIG. 15 illustrates an example block diagram for dark web content analysis and identification in accordance with an example of the present disclosure.
Figure 15:
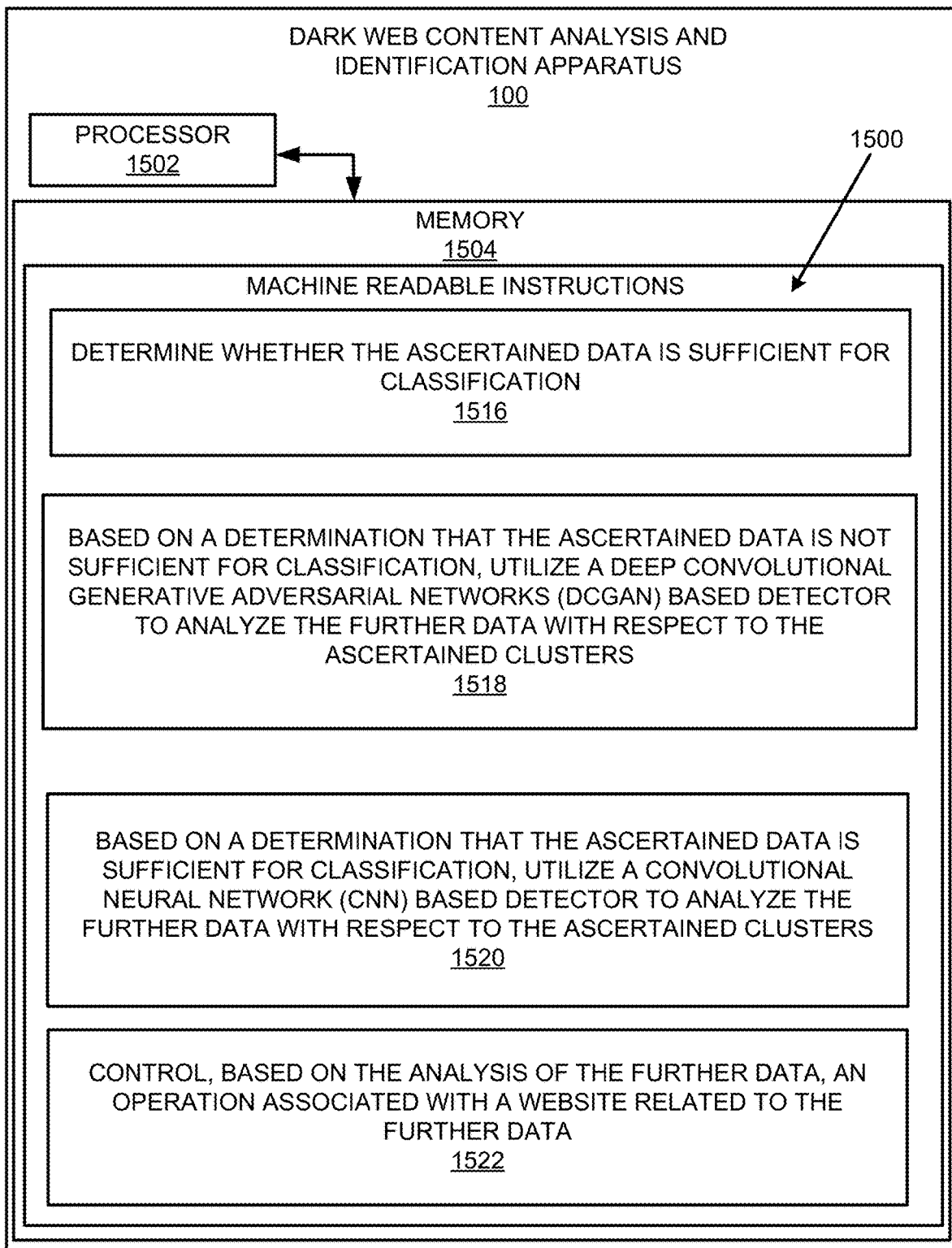

An insights based controller 122 that is executed by at least one hardware processor (e.g., the hardware processor 1502 of FIG. 15, and/or the hardware processor 1704 of FIG.

17) may control, based on the analysis of the further data 126, an operation associated with a website 124 related to the further data 126.

According to examples disclosed herein, the insights based controller 122 may control, based on the analysis of the further data 126, the operation associated with the website 124 related to the further data 126 by blocking access to the website 124 related to the further data 126.

According to examples disclosed herein, the insights based controller 122 may control, based on the analysis of the further data 126, the operation associated with the website 124 related to the further data 126 by generating an alert with respect to the website 124 related to the further data 126.

According to examples disclosed herein, the insights based controller 122 may control, based on the analysis of the further data 126, the operation associated with the website 124 related to the further data 126 by generating, based on a type and/or a severity of a corresponding cluster of the ascertained clusters, an alert with respect to the website 124 related to the further data 126.

Figure 2:
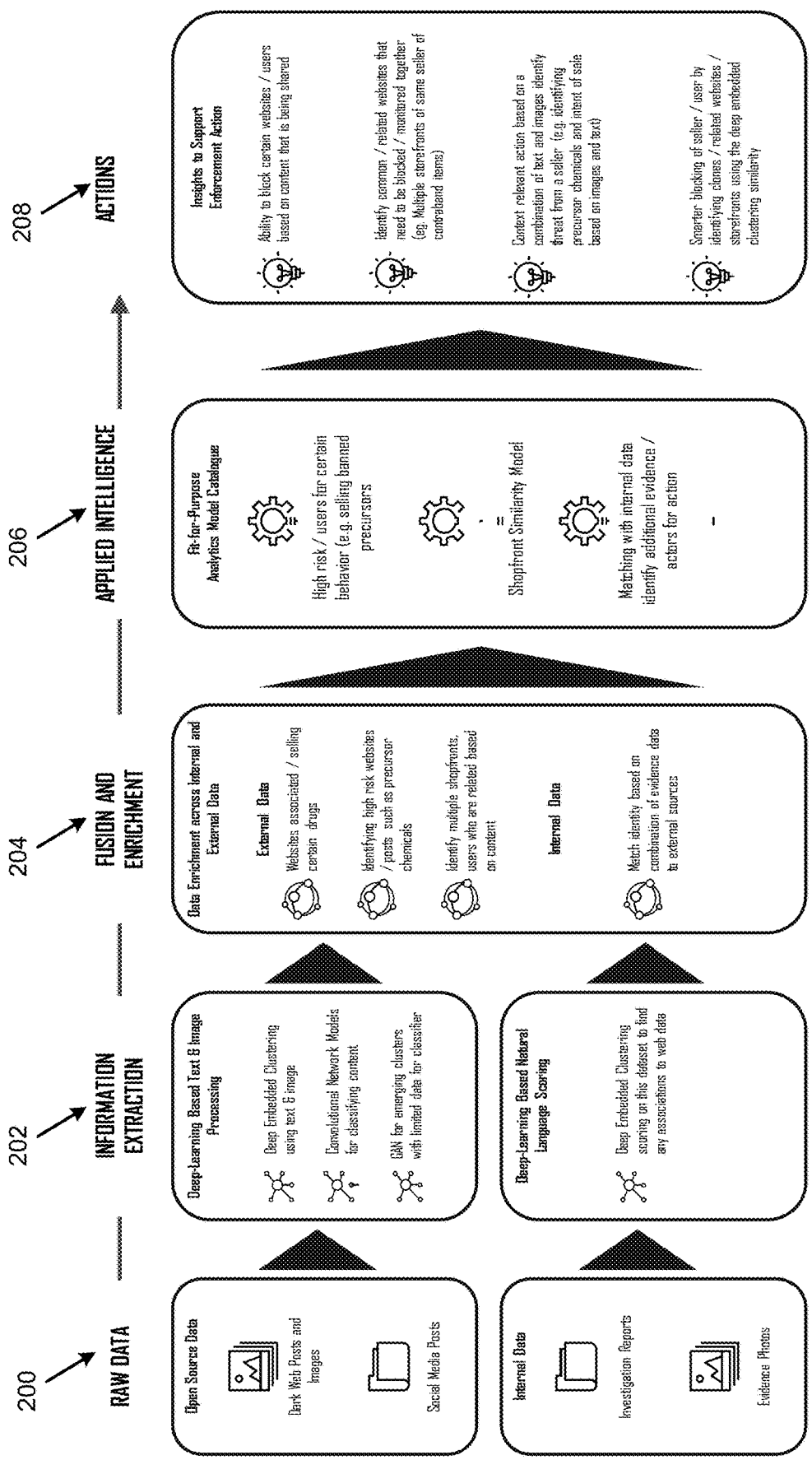
FIG. 2 illustrates a logical layout of the dark web content analysis and identification apparatus of FIG. 1 in accordance with an example of the present disclosure.

FIG. 2 illustrates a logical layout of apparatus 100 in accordance with an example of the present disclosure.

Referring to FIG. 2, at 200, the data receiver 102, that is executed by at least one hardware processor (e.g., the hardware processor 1502 of FIG. 15, and/or the hardware processor 1704 of FIG. 17), may ascertain data 104 that may include open source data 104 and internal data 104. The open source data 104 may include, for example, dark web posts and images, and/or social media posts. The internal data 104 may include, for example, reports and/or photographs. For example, in the area of law enforcement, the internal data 104 may include investigation reports, and/or evidence photographs.

At 202, the deep learning based data analyzer 110, that is executed by at least one hardware processor (e.g., the hardware processor 1502 of FIG. 15, and/or the hardware processor 1704 of FIG. 17), may perform deep embedded clustering to process text and images with respect to the open source data 104. In this regard, with respect to performance of deep embedded clustering, the deep learning based data analyzer 110 may identify which websites are similar based on images displayed in the websites. As a proportion of images may also include text within them, the deep learning based data analyzer 110 may analyze and identify both the image and the text within the image to identify which images are similar. The deep learning based data analyzer 110 may implement text identification and extraction from images. In this regard, in order to accommodate for different background images, and text color and/or font, a model may be implemented to utilize a combination of convolution neural network (CNN) and recurrent neural network (RNN) (e.g., Gated Recurrent Unit (GRU) based model for text identification and extraction). Further, the deep learning based data analyzer 110 may utilize Continuous Bag of Words (CBOW) based analysis of text from images to identify similarity between texts in images (e.g., which images have similar text content such as images that are similar because they all mention a specific drug and purity). Yet further, the deep learning based data analyzer 110 may implement deep embedded clustering on images by combining embedded space from text (e.g., similarity of text) and embedded space of image content (e.g., similarity between image content) to generate clusters where images are more likely to be similar and relevant (e.g., same content being sold, same marketing message etc.). Thus, the deep learning based data analyzer 110 may implement a CNN model for classifying content, and a deep convolutional generative adversarial networks (DCGAN) model for emerging clusters with limited data for a classifier. With respect to application of the CNN model and the DCGAN model, after deep embedded clustering is performed, specific clusters that are of interest may be selected for future monitoring and classification. For example, based on images from a website, the deep learning based data analyzer 110 may identify all websites that sell contraband, chemical precursors of interest, or a particular source of a drug. The CNN model may be built and trained to classify images to the clusters of interest. In the future, new websites and/or images may be classified to categories of interest and flagged for investigation. For some of the use cases, if sufficient training data is unavailable for a classifier, or websites may vary and/or evolve over time (e.g., to detect which websites are potential clones and/or imitators to determine that they are operated by the same person and/or syndicate, sufficient data may not be available to generate a CNN model to classify websites and/or images). In this case, the deep learning based data analyzer 110 may implement DCGAN so that the generator may augment with variations of the images and/or content to enable the detector to be more robust in detecting variations which may not be seen exactly at the given moment, but may exist in the future. Further, the deep learning based data analyzer 110 may perform the deep embedded clustering to score the internal data 104 to determine associations with web data. With respect to scoring of the internal data to determine associations with web data, the contents on the dark web may be global in nature, and according to an example, local law enforcement may need to identify what information is relevant for their country and/or city. This may require application of the classification model (CNN and DCGAN detector) on an internal repository of unstructured data (e.g. digital images collected as evidence such as avatars images) to identify which sellers on the web are potentially associated with known unauthorized entities in the region. This may facilitate the determination of targeted investigation and/or action, for example, by the law enforcement agencies.

At 204, the data enricher 114, that is executed by at least one hardware processor (e.g., the hardware processor 1502 of FIG. 15, and/or the hardware processor 1704 of FIG. 17), may perform data enrichment with respect to the external data 104 and the internal data 104. With respect to performance of data enrichment, for example, to identify certain websites, the data enricher 114 may implement the CNN and detector model from DCGAN developed in step 202, and apply these models on the set of images that are part of an internal repository of an agency (e.g., images in case details and/or records, evidence, etc.) to identify potential links between the two datasets. This analysis may provide for identification of potential links between sellers on the dark web (e.g., anonymous sellers) with known entities and/or individuals, and enable targeted intervention. In this regard, with respect to the external data 104, the data enricher 114 may perform data enrichment with respect to websites associated with and/or selling a product, such as drugs. Further the data enricher 114 may perform data enrichment to identify high risk websites and/or posts such as precursor chemicals. Yet further, the data enricher 114 may perform data enrichment to identify multiple shopfronts, and/or users that are related based on content. With respect to the internal data 104, the data enricher 114 may match identity based on a combination of evidence data to external sources.

At 206, the intelligence applicator 116, that is executed by at least one hardware processor (e.g., the hardware processor

Figure 17:
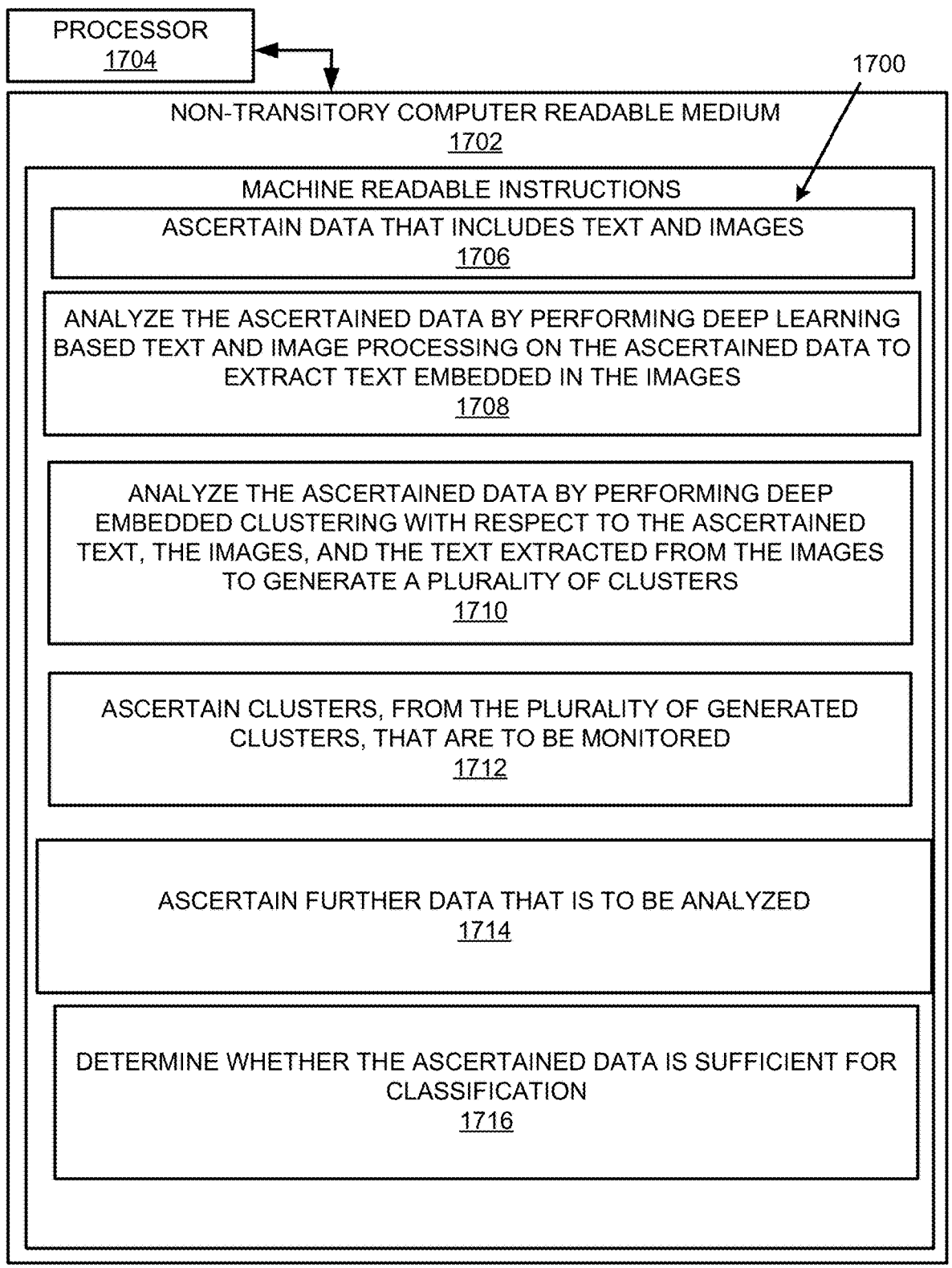
FIG. 17 illustrates a further example block diagram for dark web content analysis and identification in accordance with another example of the present disclosure.
Figure 17:
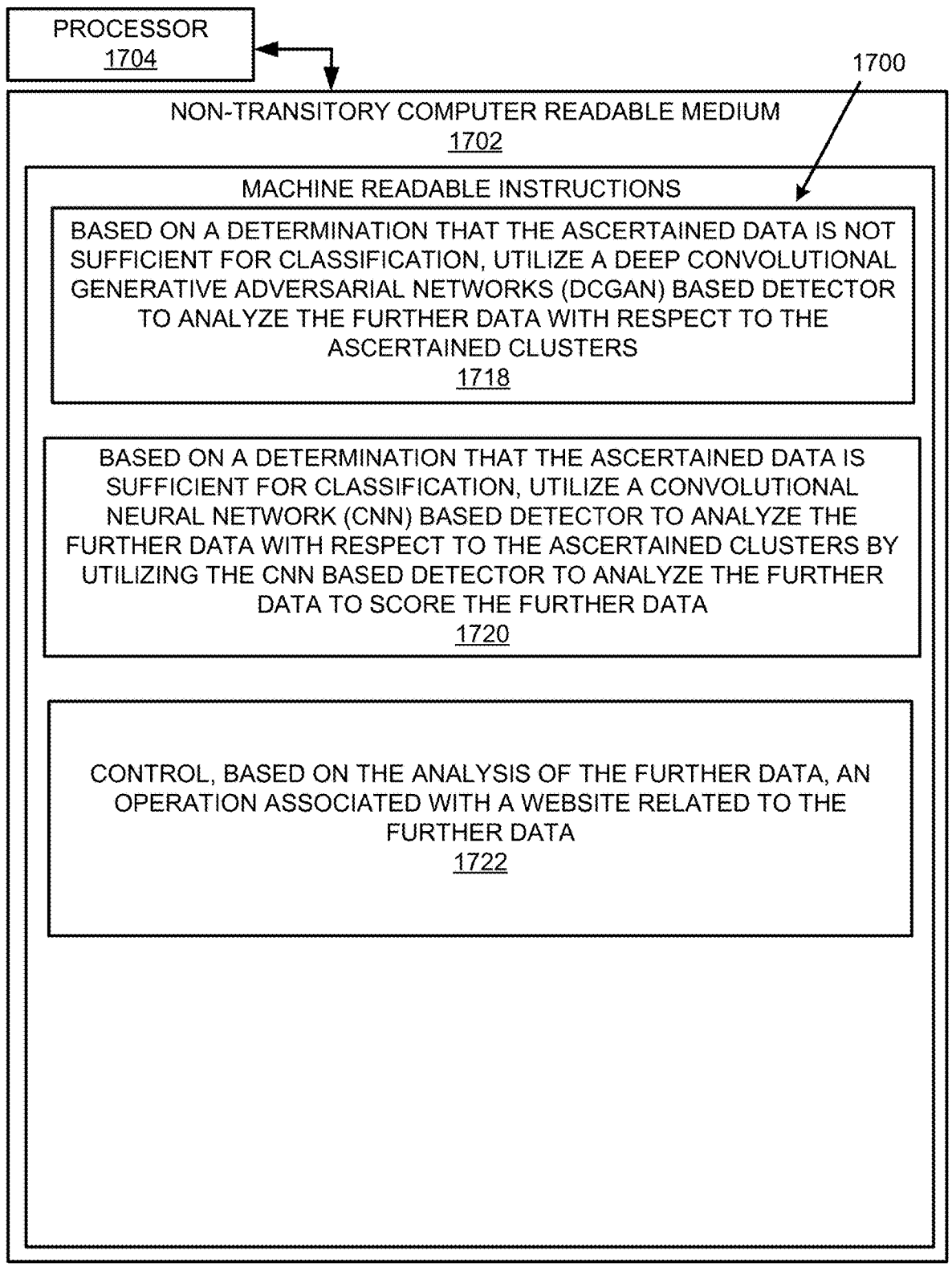

1502 of FIG. 15, and/or the hardware processor 1704 of FIG. 17), may implement a fit-for-purpose analytics model catalog. For example, the analytics model catalog may include a model for high-risk and/or users for certain behavior (e.g., selling banned precursors). With respect to the analytics model catalog, and utilization of the analytics model catalog, the intelligence applicator 116 may identify what is being sold on the dark web and potential links between the dark web data to known entities from internal evidence to perform a number of risk prediction use cases that require custom models to be developed for action. These models may take the output from deep embedded clustering (e.g., to detect new clusters and/or emerging patterns), the CNN classifier (e.g., to detect increase in trends related to a specific type of pattern), and DCGAN (e.g., to detect increase in imitator and/or clone websites) to predict risks. These models may include anomaly detection or machine learning models that learn from past data (e.g., applying an anomaly detection model on deep embedded clustering over time may facilitate the detection of emerging new clusters that are rapidly growing and/or increasing in popularity). According to another example, the DCGAN output may be used to detect increasing frequency of similar shopfronts to known and/or of interest websites to indicate increased popularity of what is being sold on that website etc. Further, the analytics model catalog may include a model for shopfront similarity. Yet further, the analytics model catalog may include a model for matching with internal data to identify additional evidence and/or actors for action.

At 208, the insights based controller 122, that is executed by at least one hardware processor (e.g., the hardware processor 1502 of FIG. 15, and/or the hardware processor 1704 of FIG. 17), may apply insights to support enforcement actions. With respect to an output, and how the output is used by the insights based controller 122 to support, for example, enforcement actions, an example of the output may be a strong match of content and/or evidence such as images of product, avatars etc., of a known entity to dark web data that may trigger an alert, for example, to an officer as an additional match that has been found. This may facilitate with gathering of evidence, for example, for a case, and also facilitate an understanding of how the content sold on dark web is making its way into the country. For example, the insights based controller 122 may block certain websites and/or users based on content that is being shared. The insights based controller 122 may identify common and/or related websites that need to be blocked and/or monitored together (e.g., multiple storefronts of a same seller of contraband goods). The insights based controller 122 may implement context relevant actions based on a combination of text and images to identify a threat from a seller (e.g., identifying precursor chemicals and intent of sale based on images and text). Further, the insights based controller 122 may implement intelligent blocking of seller and/or user by identifying clones and/or related websites and/or storefronts using deep embedded clustering similarity.

Figure 3:
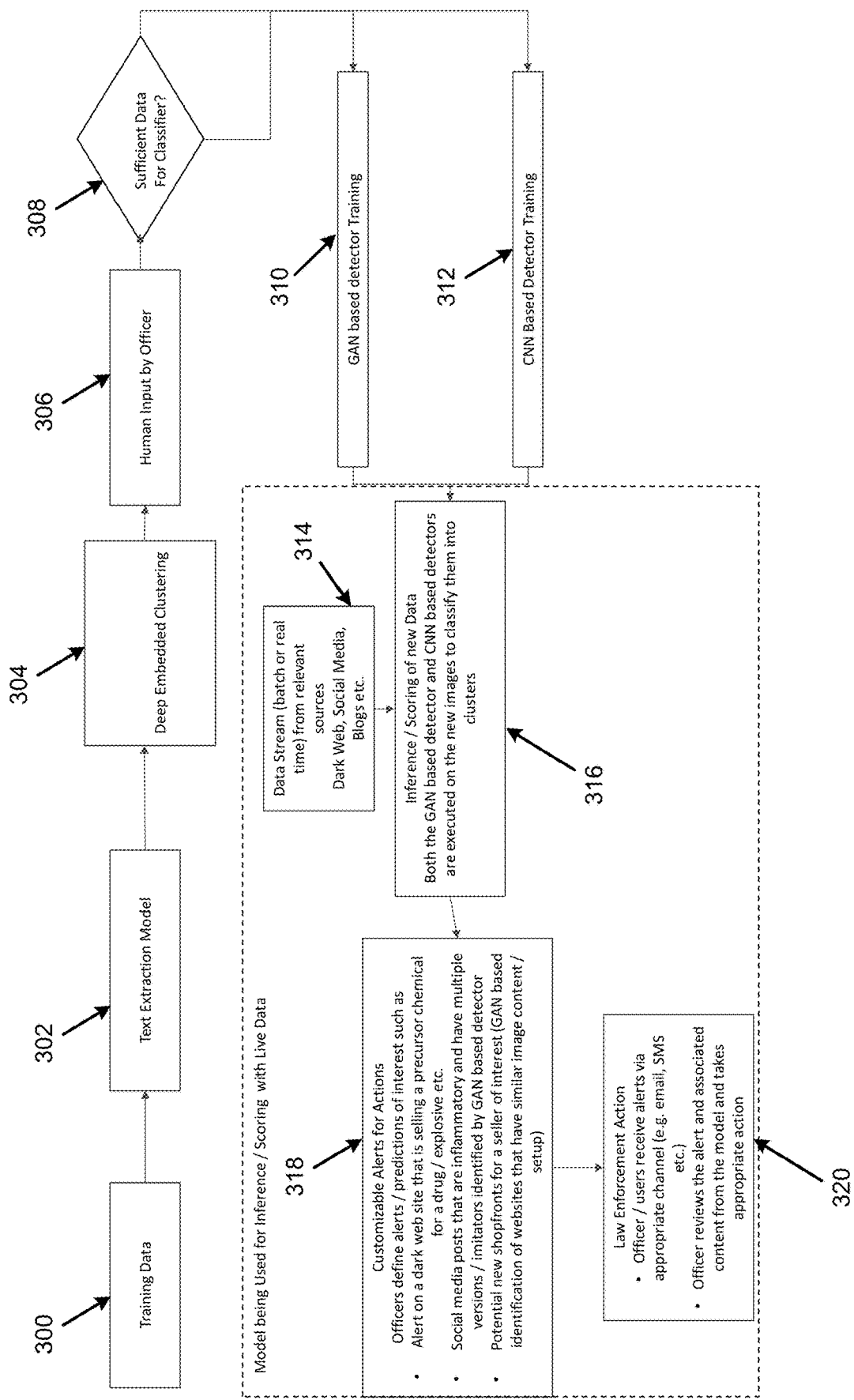
FIG. 3 illustrates details of model and decision workflow to action to illustrate operation of the dark web content analysis and identification apparatus of FIG. 1 in accordance with an example of the present disclosure.

FIG. 3 illustrates details of model and decision workflow to action to illustrate operation of apparatus 100 in accordance with an example of the present disclosure.

Referring to FIG. 3, at 300, training data may be received, for example, by the data receiver 102. The training data may include data from the dark web, social media, blogs, etc.

At 302, the deep learning based data analyzer 110 may utilize a deep learning model (e.g., a text extraction model) to identify and extract text embedded in images. With respect to the deep learning model, and how the deep learning model is used to extract text embedded in images, the deep learning based data analyzer 110 may implement a combination of models to enable higher accuracy in recognition and extraction of text in images where the background color and text fonts may vary across images. In this regard, a training dataset may be used to train the model by providing known image samples with expected text to be extracted. The deep learning based data analyzer 110 may implement, as disclosed herein, a combination of a CNN and RNN to identify character and/or text features, and extract the actual text of varying lengths. According to an example, first, a CNN model may be used to extract text features from the image i.e., locations which contain text. This model may be trained across different variations of text and background in images to facilitate the identification of text with a high degree of accuracy. The output of the CNN model, which may include identified locations with text, may be sent as input to a RNN model to identify character sequences and therefore words. In this regard, a GRU based long short-term memory (LSTM) model may be implemented to facilitate the identification of text. Similar to CNN, the GRU based LSTM model may be trained based on sample image data, and manual identification of text from the dark web data.

At 304, the deep learning based data analyzer 110 may further implement deep embedded clustering to leverage text and images together in a model. In this regard, the deep learning based data analyzer 110 may implement the approach disclosed herein with respect to FIG. 5. For example, a text embedding matrix may be created based on text extracted from an image to capture the patterns and similarity from text. A continuous bag of words (CBOW) model may be implemented to capture the structure and/or similarity between images based on text that is embedded in an image. An image embedding matrix may be implemented by utilizing a denoising autoencoder that captures the implicit structure and local features in the images by regenerating the images accurately based on the embedding matrix. The information from both text and image embedding matrices may be combined to perform clustering, and the denoising model encoder weights may be modified so that it can best separate "k" clusters in data. The clusters may identify websites that contain similar image and text content (e.g., all websites selling a particular variant of a specific type of drug, or even a cluster of potential clone and/or imitation websites as the image and language and/or text in these images of how its marketing may be similar).

At 306, the clusters identified by the models may be validated based on human input (e.g., subject matter expert) to separate out which clusters of images are relevant, for example, to an agency or a specified function. In this regard, the input may be received, for example, by a user of the apparatus 100. For example, clusters that are important for a specific context may be identified for monitoring.

At 308, a determination may be made as to whether there is sufficient data for a classifier for the selected clusters from block 306. In this regard, a threshold (e.g., 500 images) may be set for a particular cluster to utilize the CNN model. This aspect may represent the supervised learning component of the apparatus 100.

At 310, based on a determination that there is insufficient data for a classifier, the DCGAN based detector may be implemented. In this case the detector may be pre-trained with existing data available for the cluster. The generator may then compete against the detector, and in the process create additional training data that augments the training of the detector (e.g., with respect to identification of variations and/or clones of a given network of a shopfront, first, the detector may be trained using known images of the given shopfronts). This model may then be used within a DCGAN, and the generator may create additional samples which overtime become variations of the image samples the detector was trained on.

At 312, based on a determination that there is sufficient data for a classifier, the CNN based detector may be implemented to score new data where text and images are both present, or only images are present. The CNN model may be trained by utilizing training images to classify a website into specific categories (e.g., website selling specific drugs, precursor chemicals, hate crime related, etc.). The CNN model may be used to predict for a given image which cluster does the image belong to. According to an example, the CNN model may include six convolution layers and three pooling layers. An optimizer and batch normalization may be used for training, and a softmax layer in the end may predict which of the k classes does the image belong to.

At 314, new scoring data may be received, and may include data from the dark web, social media, blogs, and other such sources. New data in this context may imply periodic data extracts from the web that would indicate either new websites and/or changes in existing websites. These may indicate new shopfronts selling contraband, or existing shopfronts making changes in the content of their website to indicate new items or changes in items (e.g., higher quality drugs being sold). These may need to be analyzed by the apparatus 100 to identify specific patterns of interest (e.g., increasing trend in shopfronts related to a particular drug or even a particular purity or variant of the drug, new shopfronts which are clones and/or potentially related to existing shopfronts, etc.). The scoring may then be linked to custom models for specific use cases (explained in step 206 above) to generate alerts.

At 316, both the CNN and DCGAN based detectors may be executed on the new images and/or data to classify this information into any of the clusters that are being monitored. The insights based controller 122 may implement alerts for actions. In this regard, alerts may be defined based on type and/or severity of a cluster. The type and severity of the cluster may be defined based on the inputs from domain experts (e.g., law enforcement officers). For example, all clusters that pertain to websites that sell a particular drug may be classified as a particular type, and a high severity may be assigned to this cluster if a specific drug type is a key contraband of interest to the agency. Similarly websites and/or shopfronts with known association to a country may be given a high severity. Any detection of similar websites and/or imitators of the websites may be prioritized. For example, at 318, an alert may be generated on a dark website that is selling precursor chemicals for a drug and/or explosive. According to another example, an alert may be generated for social media posts that are inflammatory and/or an emerging trend based on the DCGAN based detector of emerging issues. According to a further example, an alert may be generated for an imitator of a previously planned and/or risky content.

At 320, for the example of a law enforcement application of the apparatus 100, a user may receive an alert via the various channels (e.g., email, short message service (SMS), etc.). Further, the type of alert and severity of a pattern detected may be reviewed to take further action, as disclosed herein with respect to the insights based controller 122.

Figure 4:
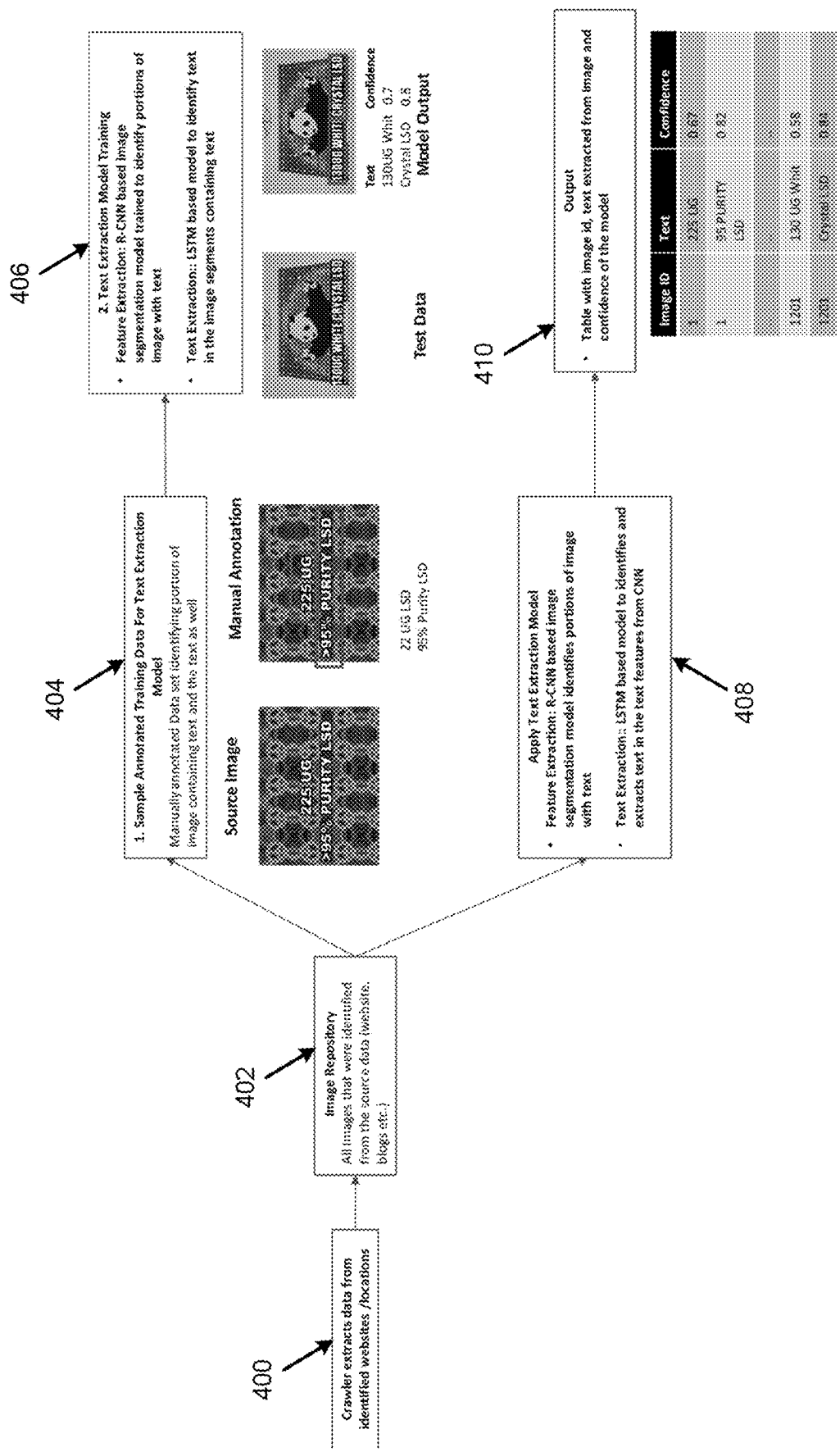
FIG. 4 illustrates an external data surveillance approach to illustrate operation of the dark web content analysis and identification apparatus of FIG. 1 in accordance with an example of the present disclosure.

FIG. 4 illustrates an external data surveillance approach to illustrate operation of apparatus 100 in accordance with an example of the present disclosure. FIG. 4 may pertain to the text extraction model discussed with respect to block 302 of FIG. 3, application of the text extraction model to images of a repository, and scoring of images in the repository for text extraction.

Referring to FIG. 4, with respect to external data 104 as disclosed herein, at 400, a crawler may be implemented by the data receiver 102 to identify locations and/or websites to identify and extract data and/or images. Locations or websites to extract data and/or images from may be specified by users based on their experience (e.g., types of websites that are currently being manually monitored). Based on the provided locations, the crawler may monitor the websites and the links to these websites to extract data. Once the crawler extracts contents of a webpage, images may then be identified based on predefined formats such as JPEG, BMP etc. The extracted images may be stored in an image repository at 402.

At 404, an annotated image data set may be generated to build the text extraction model. The annotation may include both identifying the region of the image that contains text and the extracted text itself. The annotated image data set may be used to create a custom text extraction model that is robust for the context where background color and text fonts are variable.

At 406, the text extraction model may be trained based on the annotated dataset created at 404. The text extraction model may leverage a combination of a CNN and RNN model to identify character and/or text features and extract the actual text of varying lengths. First an R-CNN (Region CNN) model may be used to extract text features from the image (i.e., regions which contain text). This model may be trained across different variations of text and background in images to facilitate the identification of text with a higher degree of accuracy. The output of the R-CNN, which may include identified locations with text, may then be sent as input to an RNN model to identify character sequences and therefore words. The GRU based LSTM model may be used to facilitate the identification of text. Similar to CNN, the GRU based LSTM model may be trained based on sample image data and identification of text from the dark web data.

At 408 the model trained at 406 may be applied on the entire image repository to identify images that have text, and to extract the text. When the model is executed on an image, the model may generate the text identified in the image and also the confidence of the model in the identified text (e.g., from the RNN model). The confidence may be used as a threshold to remove words that have low confidence to avoid error being introduced in the subsequent processing.

At 410, the results may be stored as an output table with a key being image identification (ID; e.g., filename of image) and the value being the text extracted by the model. These results may be used in the subsequent deep embedded clustering.

Figure 5:
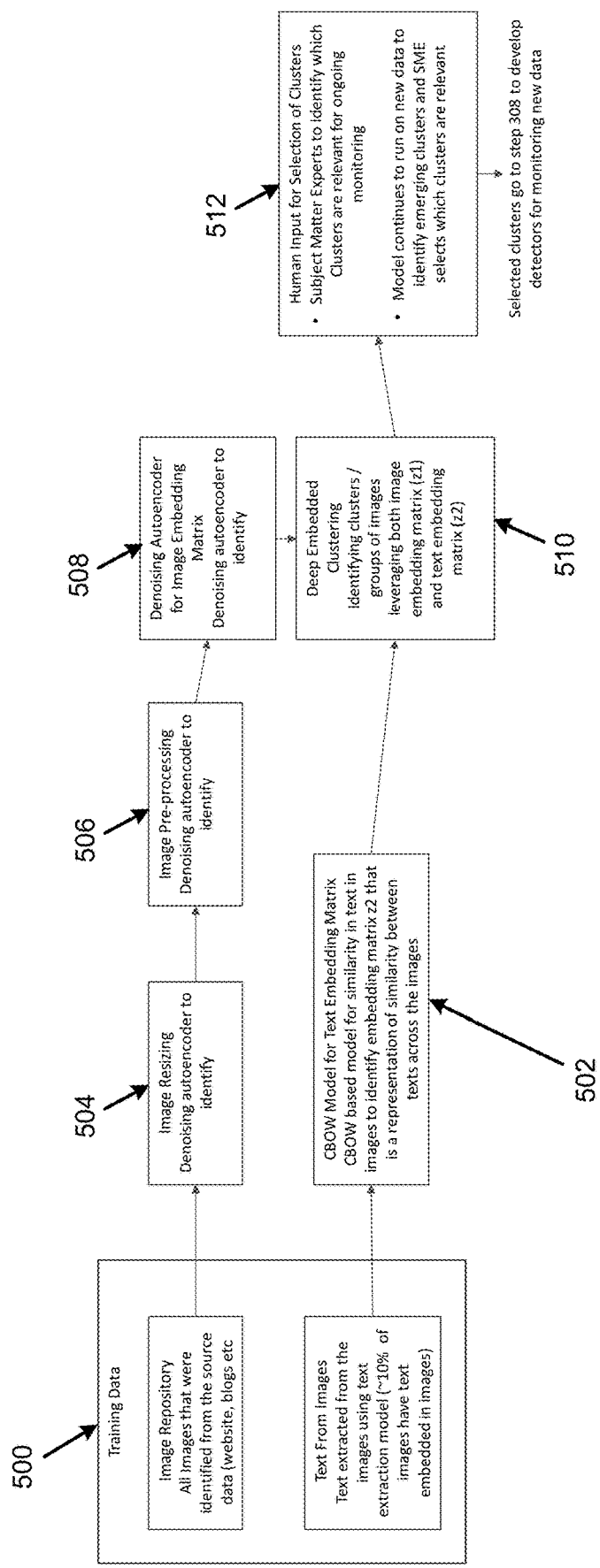
FIG. 5 illustrates deep learning based unsupervised learning to illustrate operation of the dark web content analysis and identification apparatus of FIG. 1 in accordance with an example of the present disclosure.

FIG. 5 illustrates deep learning based unsupervised learning to illustrate operation of the apparatus 100 in accordance with an example of the present disclosure.

Referring to FIG. 5, at 500, the repository of images and corresponding text extracted from the images may be utilized at 502 and 504. For example, the text and image portions may be processed separately at 502 and 504 to create lower dimensional embedding matrices for text and images respectively. Embedding matrices may capture the key patterns and/or information in the images and text while being able to recreate the original data.

Figure 6:
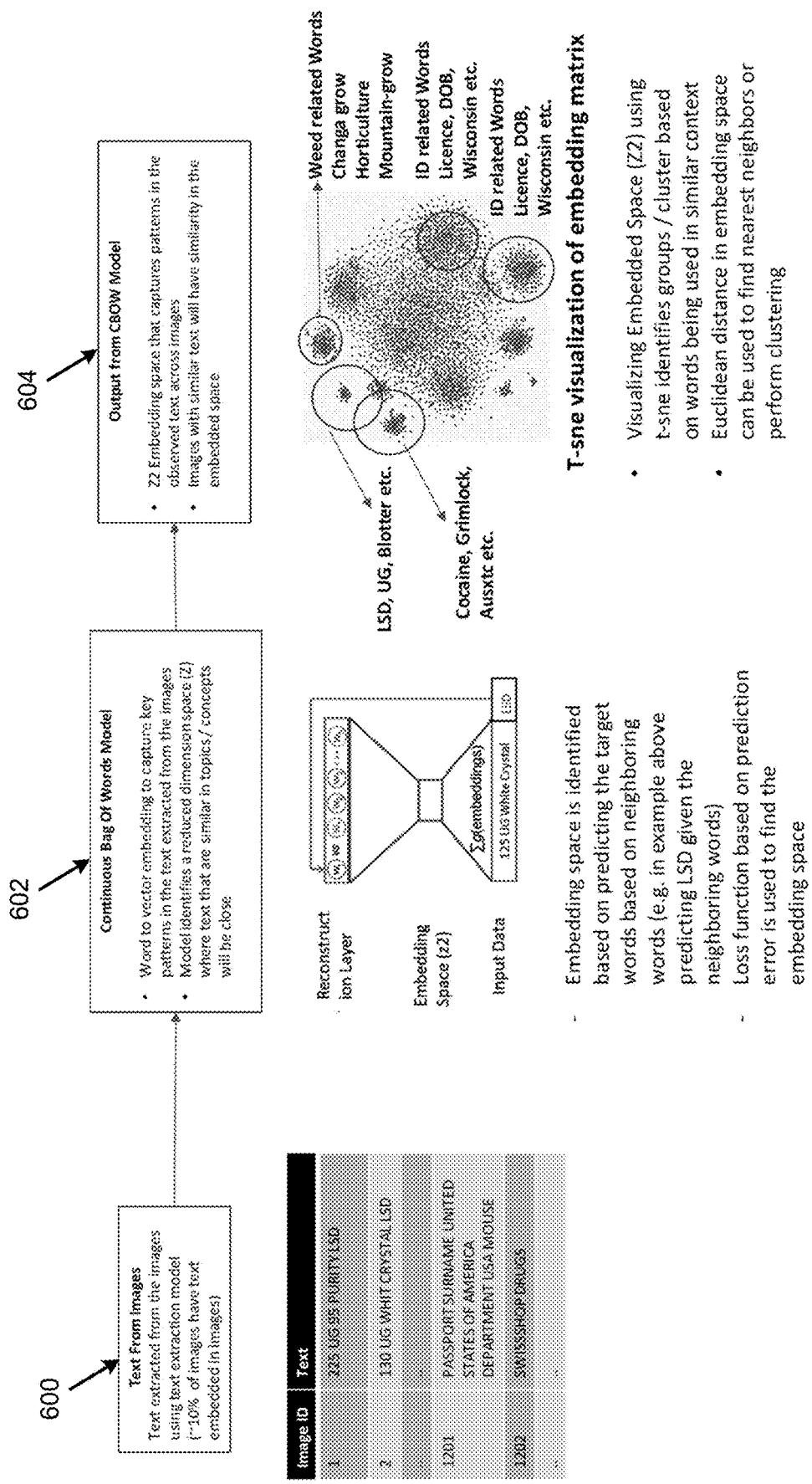
FIG. 6 illustrates text embedding matrix generation to illustrate operation of the dark web content analysis and identification apparatus of FIG. 1 in accordance with an example of the present disclosure.

At 502, with respect to text embedding matrix creation, a continuous bag of words may be utilized to determine the embedding matrix that captures the key relationship and/or patterns found across all text extracted from all images, as disclosed herein with respect to FIG. 6.

At 504, with respect to image embedding matrix creation, in order to determine the embedding matrix for images, images may be resized to ensure that they are the same size.

At 506, the images may be pre-processed using, for example, histogram equalization to improve quality of an image.

Figure 7:
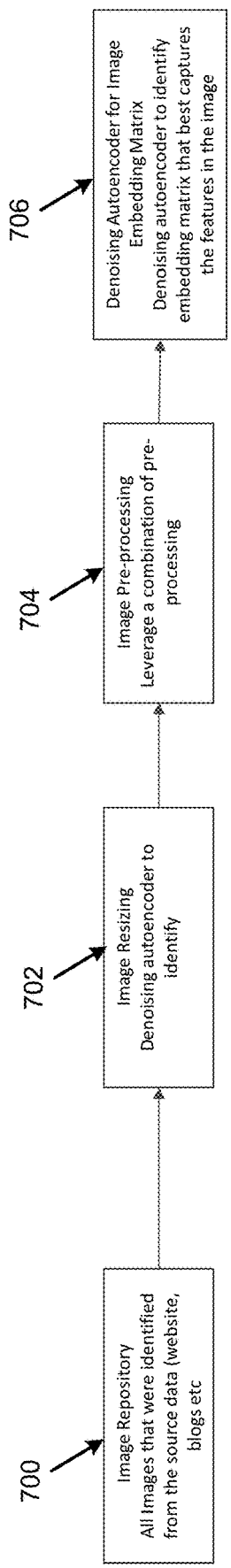
FIG. 7 illustrates image embedding matrix generation to illustrate operation of the dark web content analysis and identification apparatus of FIG. 1 in accordance with an example of the present disclosure.
Figure 7:
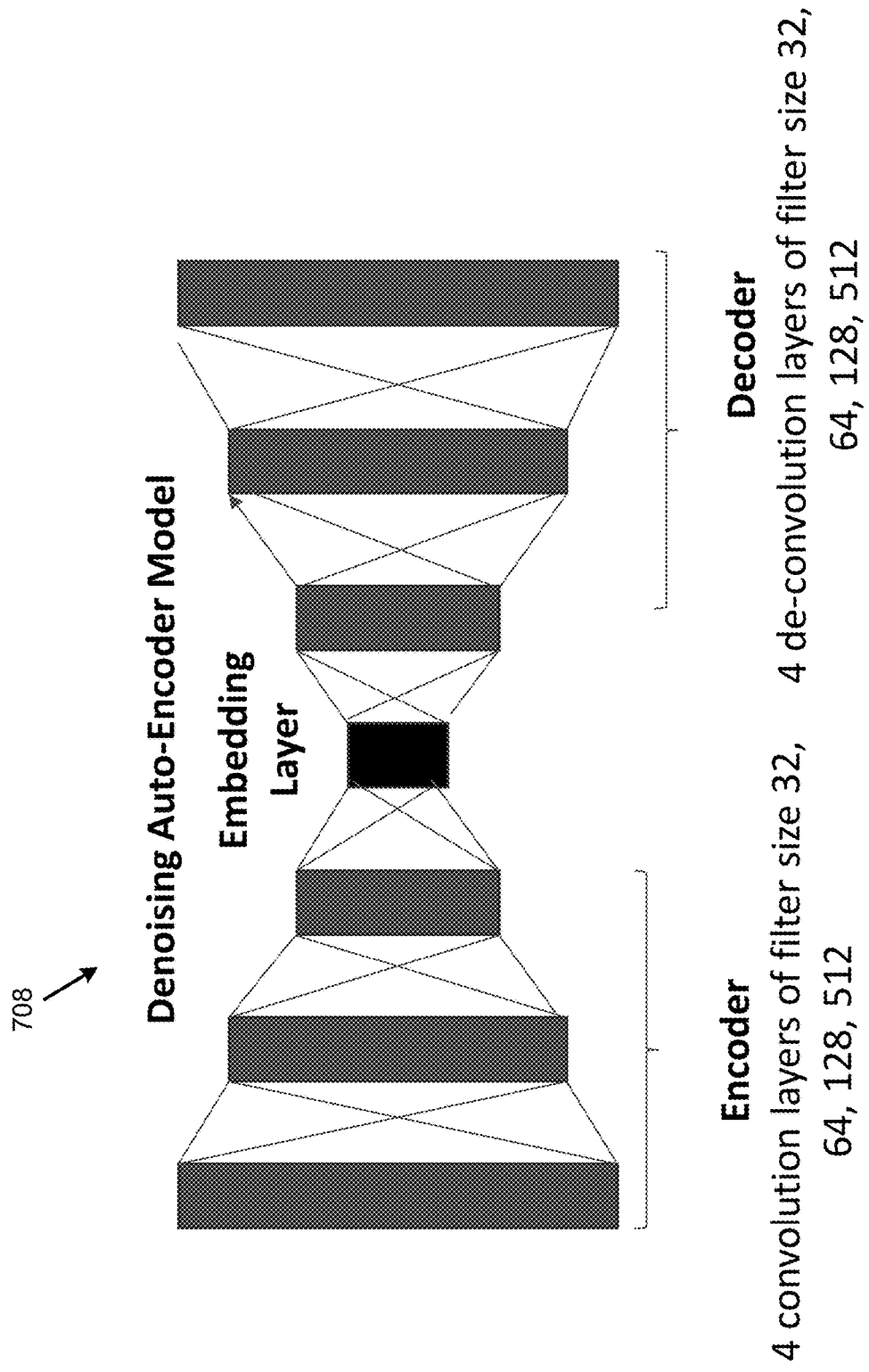

At 508, a denoising encoder may be utilized to generate the embedding matrix that captures the key patterns in the images into a lower dimension embedding, as disclosed herein with respect to FIG. 7.

At 510, with respect to deep embedding clustering combining text and image, embedding matrices from image and from text may be utilized to identify similarity between images, and the images may be clustered into groups that are very similar in nature.

At 512, with respect to user Input to select which clusters are relevant for use cases, the clusters may be analyzed, for example, by a subject matter expert to confirm which clusters are of interest for monitoring based on use cases. In this regard, selected clusters may be sent to block 308 to develop detectors for monitoring new data.

FIG. 6 illustrates text embedding matrix generation to illustrate operation of the apparatus 100 in accordance with an example of the present disclosure.

Referring to FIG. 6, with respect to implementation of text embedding matrix generation at 502, at 600, the input may include text extracted from images which are in the repository from 410. In this regard, dimension reduction may be performed, for example, by implementing word2vec. By reducing dimension, the key elements of text may be distinguished from noise, and therefore facilitate identification of similarity between texts.

At 602, a Continuous Bag of Words (CBOW) approach may be utilized to identify the reduced embedded space that captures the relationship between words in the corpus of text extracted from images. The objective of the CBOW model may include capturing the relationships between the words in sentences across the corpus of sentences extracted across all the images. The CBOW model may identify an embedding space that best captures the relationship between the words in the training data based on the defined loss function. Given the sequence of words observed in each image, the CBOW model may learn the embedding space by (z2) in FIG. 6 that is able to maximize the prediction of the next word in a sentence. The embedding space z2 may then be used to identify relationships between words (e.g., words that are similar or used in the same context are closer in the embedding space). Therefore, texts which are similar (e.g., therefore images from which the text were extracted) will be closer to each other in embedded space even though they do not share all the same words. For example, "Passport USA Mickey Mouse DOB 01/02/1980" and "Passport United Kingdom Mickey Mouse DOB 04/10/1972" may be closer to each other even though they do not share a majority of the text but include a similar sequence of the text. This allows for the identification of images that have potentially the same content based on text.

At 604, the embedding matrix, which may be highly dimensional, may be visualized using techniques such as t-sne to identify which words and text samples cluster together. For example, for text from images such as "LSD 0.95 purity", "Passport America Mickey Mouse", "Need LSD now", "Passport America Angelina Jolie" etc., text similarity may identify images 1 and 3 as more similar due to occurrence of common text content (LSD), and images 2 and 4 to be more similar due to common text content (passport) etc. Thus, images may be clustered/grouped based, for example, on sharing of a common pattern of text relating to specific topics. For those images with no text embedded inside, this model may not provide any distance information. Therefore, the embedding space may provide one aspect of similarity between images. The embedding matrix may be stored, and denoted z2, which may be used later in deep embedded clustering.

FIG. 7 illustrates image embedding matrix generation to illustrate operation of the apparatus 100 in accordance with an example of the present disclosure.

Referring to FIG. 7, with respect to the image embedding matrix generation described in blocks 504, 506, and 508, when using a convolution based approach, all images may be modified to include a common size (e.g., 128×128×3 size). In this regard, for images from the image repository at 700, at 702, image resizing may be performed based on the modeling needs.

At 704, images may be pre-processed to improve quality. As the input image quality is variable (e.g., based on whatever image is uploaded on the website), a series of image pre-processing steps may be implemented to help improve quality of images when needed. For example, histogram equalization may be performed to ensure more uniform distribution of intensities to improve contrast. Wavelet based denoising may be performed using adaptive thresholds to adaptively shrink Wavelet coefficients, which are smaller in value and may represent noise in the data.

At 706, the embedding matrix from image data leveraging may be determined by using an auto encoder. In this regard, an objective of the auto encoder may include finding a lower dimensional embedding that is able to capture the key features in the images and remove the noise from the images. An undercomplete encoder that forces dimension of the embedding layer to be smaller than the input image dimension may be used to identify the most important features of the image data. In order to identify the embedding matrix, an encoder layer with four convolution layers, a dense layer defining the embedding matrix, and four deconvolution layers to recreate the images may be generated. The loss function for finding the embedding matrix may affect the reconstruction loss after decoder (e.g., output image may need to be similar to the input image but with a smaller dimensional embedding matrix z2).

At 708, the denoising encoder structure may include an embedding layer, an encoder, and a decoder as shown.

At 710, an example of the parameters that need to be estimated for the model are shown for the denoising auto-encoder model at 708.

Figure 8:
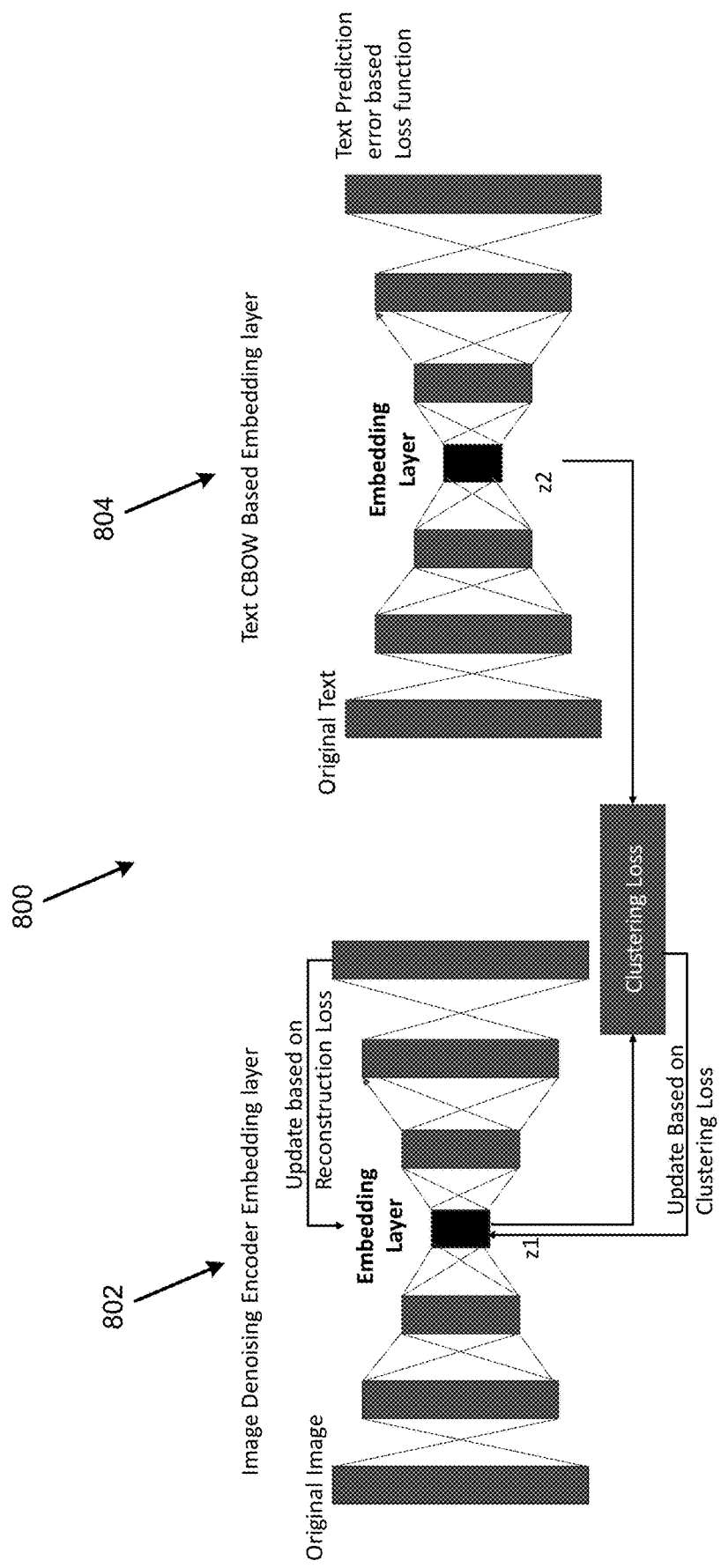
FIG. 8 illustrates deep embedded clustering combining text and image to illustrate operation of the dark web content analysis and identification apparatus of FIG. 1 in accordance with an example of the present disclosure.

FIG. 8 illustrates deep embedded clustering combining text and image to illustrate operation of the apparatus 100 in accordance with an example of the present disclosure.

Referring to FIG. 8, the image embedding matrix (z1) may be combined with the text embedding matrix (z2) to perform clustering to identify images that are similar by combining both image and text similarity. The deep embedded clustering combining text and image may be performed by utilizing an image the noise a encoder embedding layer 802, and eight text CBOW based embedding layer 804. The encoder at 802 may be optimized such that the updated matrix z1 best identifies clusters in the data without distorting the embedding matrix too much (to ensure features in the image is preserved). The encoder weights may be optimized using a combined loss function that covers reconstruction error and clustering loss:

$$L = L_r + \gamma L_c \quad \text{Equation (1)}$$

For Equation (1), $L_r$ may represent the loss that captures the reconstruction difference between the original image and image generated after applying the decoder on the embedding matrix values for a given image. Further, $L_c$ may represent the clustering loss value, where the clustering loss may be expanded to consider both image clustering loss and also the clustering loss that can be obtained from the text extracted from the images. The $\gamma$ value may be between 0 to 1 where a value of zero makes it the same as the encoder output (e.g., no clustering influence on embedding matrix) while a value of 1 makes the clustering loss as important as the reconstruction loss (e.g., allowing larger modifications to the embedding matrix even if reconstruction errors are higher).

The denoising encoder May create an embedding matrix z1 based on finding a sparse structure that preserves the local structure of data. In clustering, the encoding step that creates z1 may be tuned by optimizing a loss function that finds high density clusters for predefined number of clusters k. The information from both z1 (from image) and z2 (from text) may be combined to identify similarity between samples, and a loss function may be used to adjust the encoding weight values in the encoder to best separate k-clusters of images.

The determination of each of the loss components may be implemented as follows.

The encoder layer weights $W_{encoder}$ that cover three sources of information may be adjusted as follows. First, with respect to $L_r$ for Local structure preservation, this may ensure that any changes to the embedding matrix does not distort the image too much. In this regard, the reconstruction loss may be measured using a MSE (mean squared error) between the original image and reconstructed image.

$$L_r = \Sigma_{i=1}^{n} \|x_i - g_w(z_{1,i})\|2 \quad \text{Equation (2)}$$

For Equation (2), $g_w$, may represent the decoder component of the auto-encoder defined above with w being the weights learned by the decoder. For Equation (2), $z_1$ may represent the embedding matrix generated by the encoding component of the auto-encoder ($z_{1,i} = f_k(x_i)$), with k being the weights learned by the encoder. Both of the weights may be learnt by the model through backpropagation of errors (e.g., minimizing the loss function).

Secondly, with respect to the clustering loss value ($L_c$), the clustering loss function may the determine KL divergence between two distributions Q (e.g., based on similarity of images based on text embedding matrix and image embedding matrix) and P (e.g., target distribution based on soft labels of images to clusters which is iteratively refined based on Q) as shown in Equation (3).

$$Lc = KL(P\|Q) = \sum_i \sum_j p_{i,j} * \log\left(\frac{p_{i,j}}{q_i}\right) \quad \text{Equation (3)}$$

For Equation (3), $q_{i,j}$ may represent the distance of image i (i in 1 to N: number of images in the repository) with cluster j (j in 1 to k: number of clusters defined by a user), and $p_{i,j}$ may represent the target distribution defined as follows:

$$p_{i,j} = \frac{\frac{q_{i,j}^2}{\sum_j q_{i,j}}}{\sum_j \left(q_{i,j}^2 / \sum_j q_{i,j}\right)} \quad \text{Equation (4)}$$

For Equation (4), the key component of the calculations may be given by distance of image to cluster centers $q_{i,j}$, which may be estimated by leveraging both the text embedding matrix and image embedding matrix as follows.

The distance matrix may be defined as a weighted combination of similarity from text and images embedding matrices described in Equation (5)

$$q_{i,j} = l_{i,j} + w * k_{i,j} \quad \text{Equation (5)}$$

For Equation (5), $l_{i,j}$ may represent the distance between image i and cluster j center based on image embedding ($z_1$), and $k_{i,j}$ may represent the distance between image i, and cluster j center based on text embedding matrix ($z_2$).

With respect to $l_{i,j}$ and $k_{i,j}$, these variables may be determined as follows. With respect to clustering distance based on image embedding similarity, for a given prior assumption of K clusters, k cluster centers may be initialized in the embedding space z1, and the distance of each image may be measured to the cluster centers.

The distance of each image i ($z_{1,i}$) to the cluster center $\mu_{1,j}$ in the embedding space measured by student t-distribution may be determined as follows.

$$l_{i,j} = \frac{(1 + \|z_{1,i} - \mu_{1,j}\|^2)^{-1}}{\sum_j (1 + \|z_{1,i} - \mu_{1,j}\|^2)^{-1}} \quad \text{Equation (6)}$$

For Equation (6), the denominator may sum over all clusters to normalize the distance in a same manner as the Equation (7) denominator (and may also be represented as summation of j=1 to K, where K is the number of clusters). With respect to clustering distance based on text embedding similarity, similar to image embedding, for the K-clusters, k cluster centers in the embedding matrix z2 may be initialized, and the distance of each image to the cluster center $\delta_{1,j}$ in the embedding space $z_{2,i}$ may be measured by student t-distribution. In this regard, extracting and comparison of text embedded in images may provide a key measure of similarity in images.

$$k_{i,j} = \frac{(1 + \|z_{2,i} - \delta_{1,j}\|^2)^{-1}}{\sum_j (1 + \|z_{2,i} - \delta_{1,j}\|^2)^{-1}} \quad \text{Equation (7)}$$

As this distance is available for those images, the initial clustering may be performed using those images with embedded text to determine the updated embedding matrix ($z_1$) after the encoder weights are optimized for clustering loss. Thereafter, the updated embedding matrix may be utilized, but now, the entire set of images may be clustered using the updated embedding matrix for improved clustering performance across all the images, as disclosed herein with respect to FIG. 9.

Figure 9:
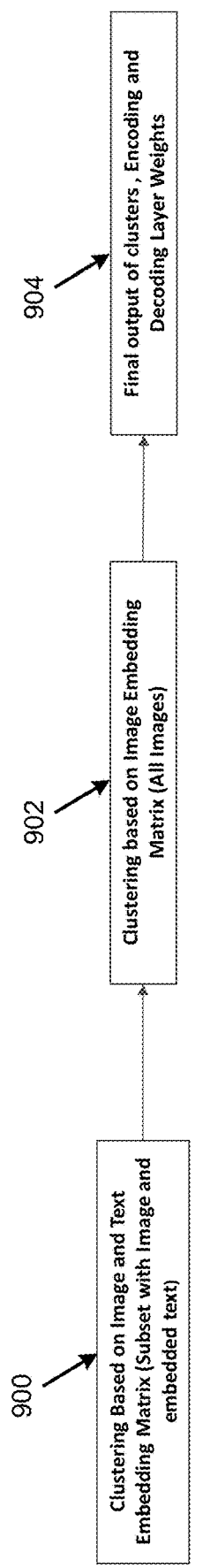
FIG. 9 illustrates a two-step clustering approach to illustrate operation of the dark web content analysis and identification apparatus of FIG. 1 in accordance with an example of the present disclosure.

FIG. 9 illustrates a two-step clustering approach to illustrate operation of the apparatus 100 in accordance with an example of the present disclosure.

Referring to FIG. 9, at 900, with respect to updating autoencoder weights for $z'_1$ (in this regard, both the distance matrices (text and image) may be used to adjust the embedding matrix $z_1$) and cluster centers using text and image information, based on the loss function described in Equation (1) (and its components in Equations (2) and (3)) the autoencoder parameters and cluster centers may be iteratively updated using gradient descent techniques (E.g. stochastic gradient descent). The autoencoder weights for $z_1$ is updated and this embedding matrix may be used in a next step as an input to perform clustering on the entire repository of images including those with no text information.

At 902, the with respect to adjusting encoder weights for $z_1$ and cluster centers, the entire repository of images (including those with no text) may be utilize to perform another step in clustering. Starting with the encoding layer from step 902, the centers for k clusters which were optimized may be clustered based on subset of images containing both images and text. The gradient descent technique for Equation (1) may be applied for the entire set of images. The text information for the second clustering may be ignored, and thus Equation (5) may be modified as shown below to the measure distance to cluster centers using only image information. The remaining optimization may be performed as disclosed for step 900.

$$q_{i,j}=l_{i,j}$$

At 904, the final output may include an output from the model that includes the cluster center, cluster membership of each image, and the updated encoder/decoder weights for the image.

Figure 10:
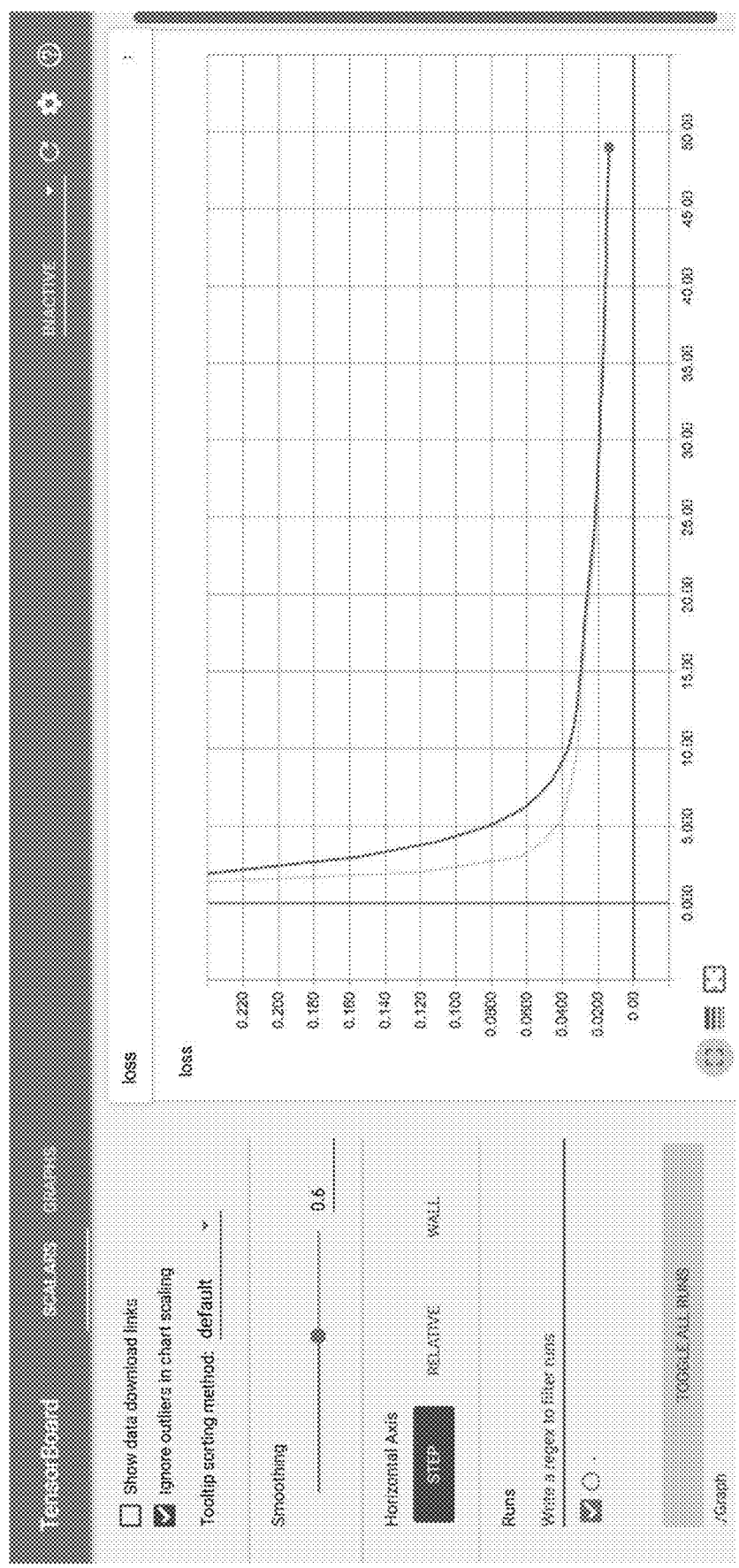
FIG. 10 illustrates loss function optimization over epochs using a stochastic gradient descent (SGD) based approach to illustrate operation of the dark web content analysis and identification apparatus of FIG. 1 in accordance with an example of the present disclosure.

FIG. 10 illustrates loss function optimization over epochs using a stochastic gradient descent (SGD) based approach to illustrate operation of apparatus 100 in accordance with an example of the present disclosure.

Figure 11:
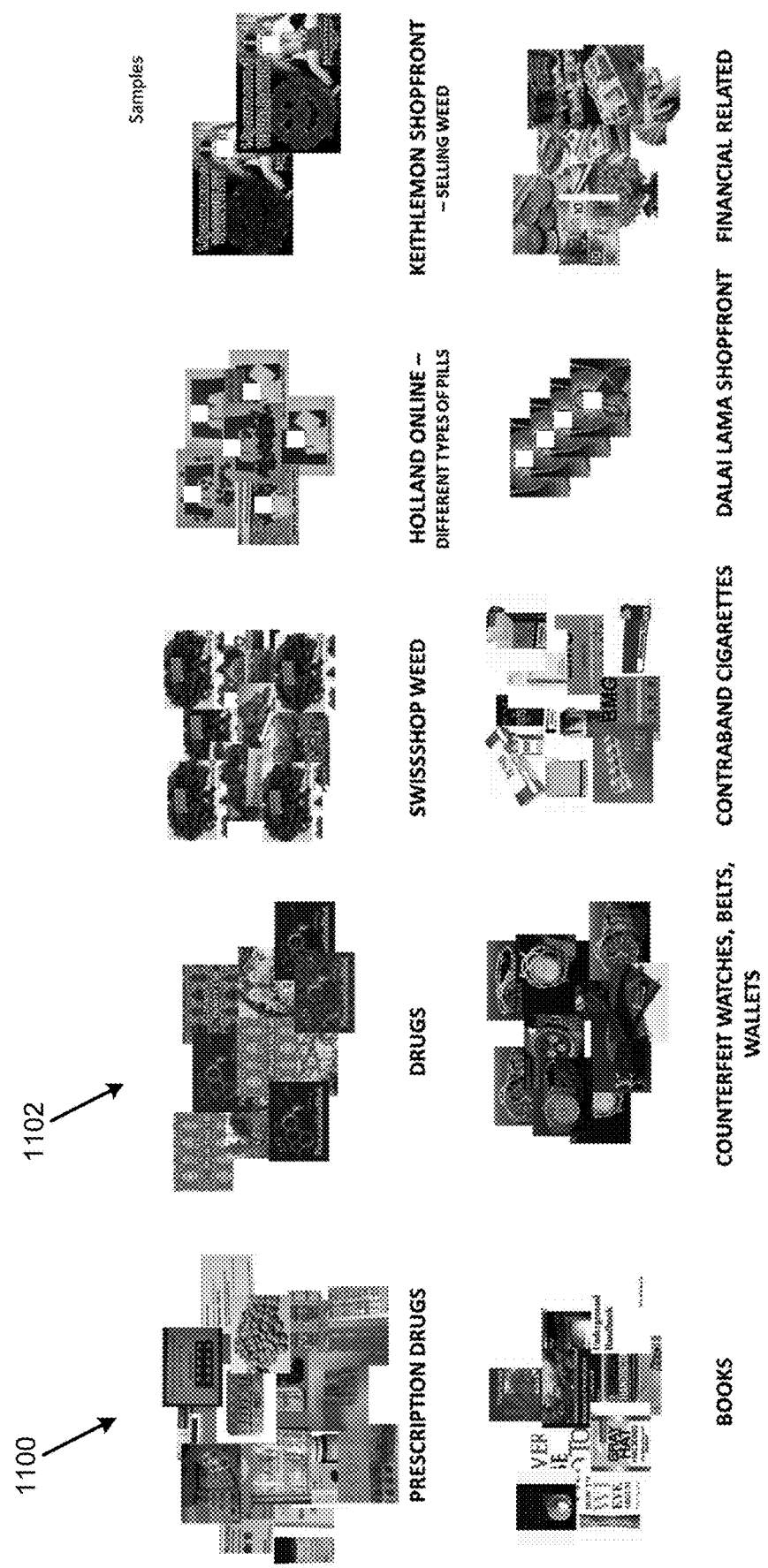
FIG. 11 illustrates an example output of clusters generated from images related to various categories to illustrate operation of the dark web content analysis and identification apparatus of FIG. 1 in accordance with an example of the present disclosure.

FIG. 11 illustrates an example output of clusters generated from images related to various categories to illustrate operation of the dark web content analysis and identification apparatus 100.

Referring to FIG. 11, various clusters may be generated from images related to various categories. For example, clusters may be generated for images related to prescription drugs as shown at 1100, drugs as shown at 1102, etc.

Figure 12:
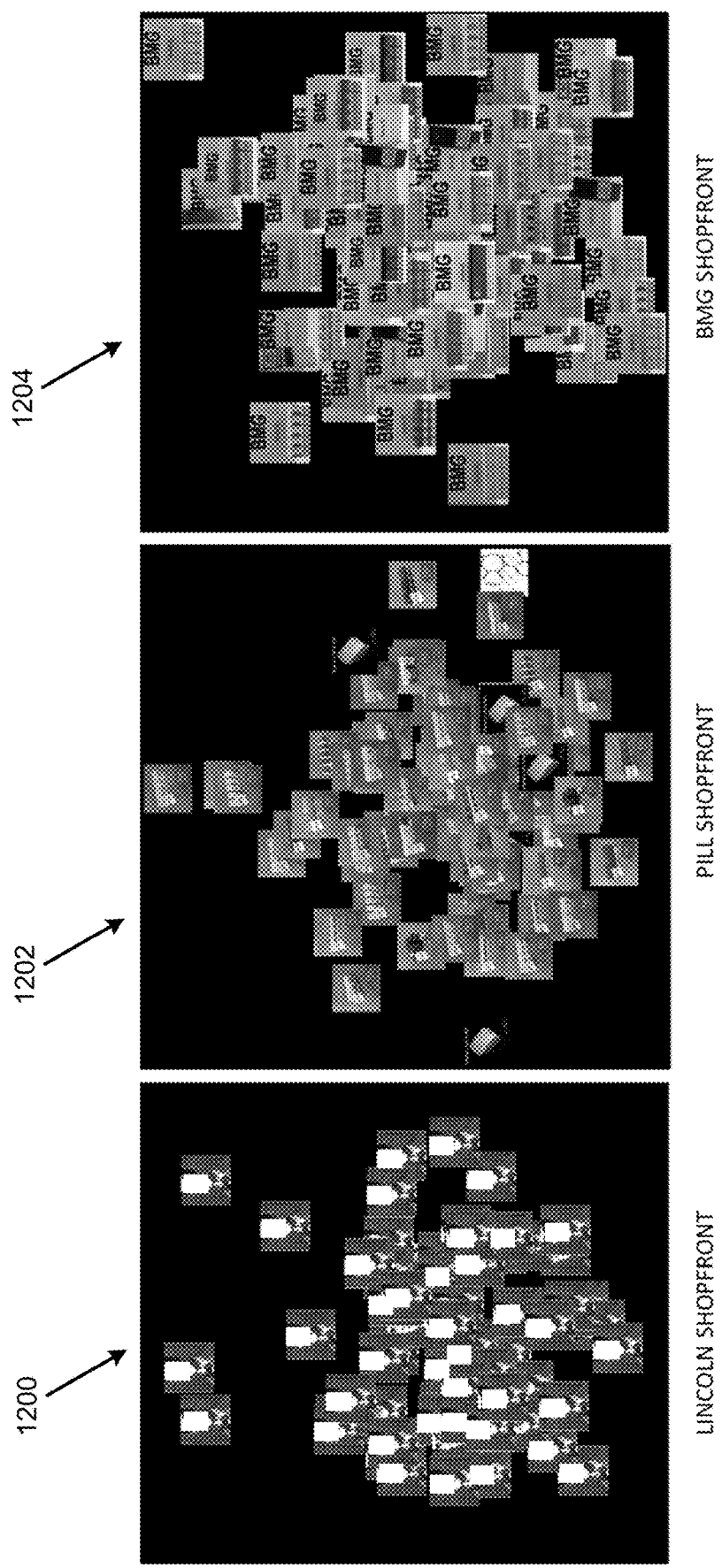
FIG. 12 illustrates example outputs of different webpages that include similar images to indicate related or a same seller to illustrate operation of the dark web content analysis and identification apparatus of FIG. 1 in accordance with an example of the present disclosure.

FIG. 12 illustrates example outputs of different webpages that include similar images to indicate related or a same seller to illustrate operation of apparatus 100 in accordance with an example of the present disclosure.

Referring to FIG. 12, in order to remain anonymous or to conceal a seller's identity, a seller may generate multiple shopfronts. In this regard, as shown in FIG. 12, the images at 1200, 1202, and 1204 from different webpages may include similarities. The images at 1200, 1202 and 1204 may be obtained from multiple websites. For example, the images at 1200 may be obtained from ten different websites, wherein the clustering identified them as similar in content. On evaluation, these websites may use the same images including that of a specific individual. Thus the images may be related to sellers that are related, or are the same seller. Similarly, other potentially related sellers and/or shopfronts our illustrated in the examples at 1202 and 1204.

Figure 13:
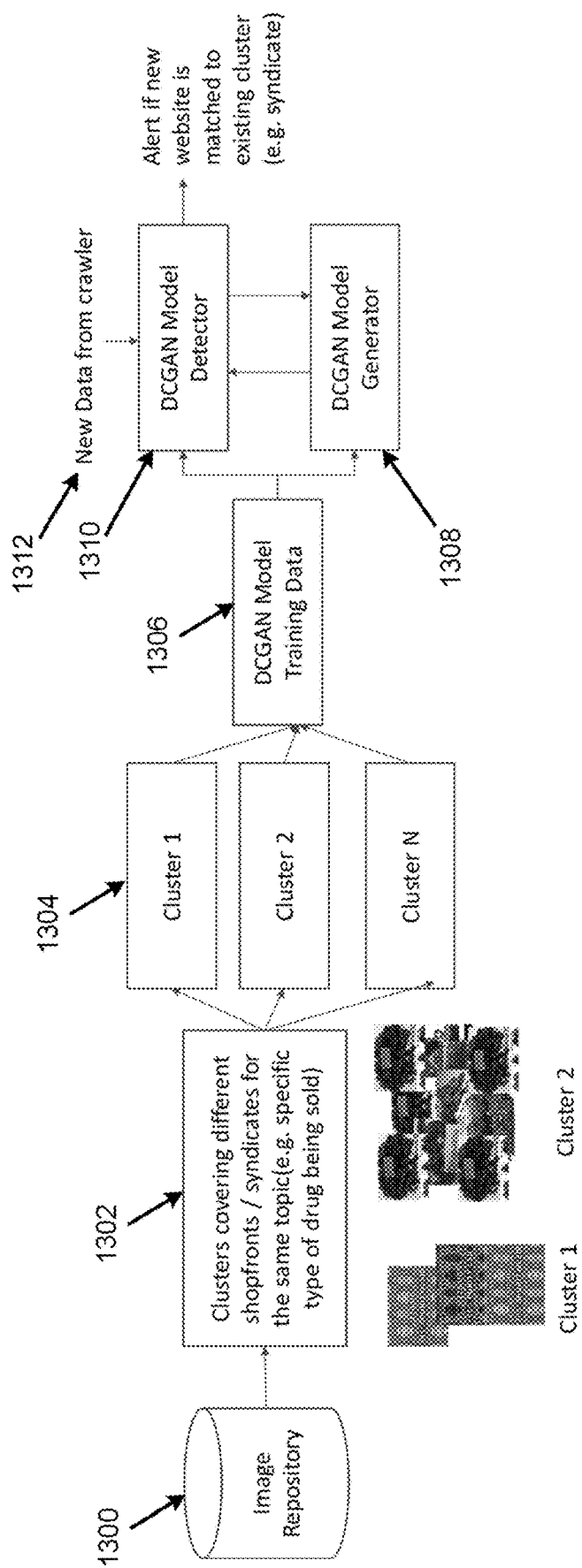
FIG. 13 illustrates implementation of deep convolutional generative adversarial networks (DCGAN) for modeling imitators and related shopfronts to illustrate operation of the dark web content analysis and identification apparatus of FIG. 1 in accordance with an example of the present disclosure.

FIG. 13 illustrates implementation of deep convolutional generative adversarial networks (DCGAN) for modeling imitators and related shopfronts to illustrate operation of apparatus 100 in accordance with an example of the present disclosure.

Referring to FIGS. 3 and 13, given that the dark web provides significant anonymity, it may be difficult to identify related shopfronts and/or sellers based on structured data. At the same time, sellers may attempt to continuously develop and/or open new shopfronts to not attract attention and/or to remain anonymous. Given the limited number of samples associated with the websites and dynamic evolution of the websites over time, a static classifier may not be able to identify related websites. In this regard, with respect to the DCGAN model at 310 of FIG. 3, DCGAN (Deep Convolutional Generative Adversarial Networks) may be implemented to build a model that learns from the data, and identifies potentially related websites, and also how the websites may evolve based on a search criteria. In order to detect potential related shopfronts, specific clusters may be analyzed with respect to shopfronts, as well as other clusters unrelated to shopfronts, but selling similar items (e.g. the model will need to identify if a specific website is related to a syndicate selling a particular drug based on similarity of images), may also be analyzed. In this regard, the model may be used to determine how different it is from other shopfronts and/or websites selling the same drug.

An informative DCGAN, which has class and/or cluster information as a latent variable for the generator, may be utilized to learn to generate images and/or content differently for each cluster and/or class. In this regard, FIG. 13 provides an illustration of the approach.

At 1300, for the image repository with each image assigned to a specific cluster, at 1302, a set of clusters that correspond to a given topic of interest (e.g., drugs, counterfeit articles, images and/or posts corresponding to inflammatory content and/or fake news, etc.), may be ascertained. Initial training of the DCGAN model may be performed at 1306 from the clusters at 1304. For the generator at 1308, Generator G(z,c) may be utilized with z being the noise, and c being latent variables (e.g., c1, c2, . . . cl corresponding to l clusters) so that the generator generates images that are different for each cluster. For the detector at 1310, the detector may classify the image (from generator during training) to one of the l clusters. The detector and the generator may be trained over epochs such that they reach equilibrium where the generator is able to create "realistic" but not the same images for each cluster, while the detector may be trained on a larger and more varying set of images for each cluster.

At 1312, the detector at 1310 may be applied to new data being crawled from the Internet, with the enhanced detector trained on variations from the generator having better capability to match an image to known clusters. If the match is made, then an alert may be sent informing the user on a new website and/or content related to what is being monitored.

Figure 14:
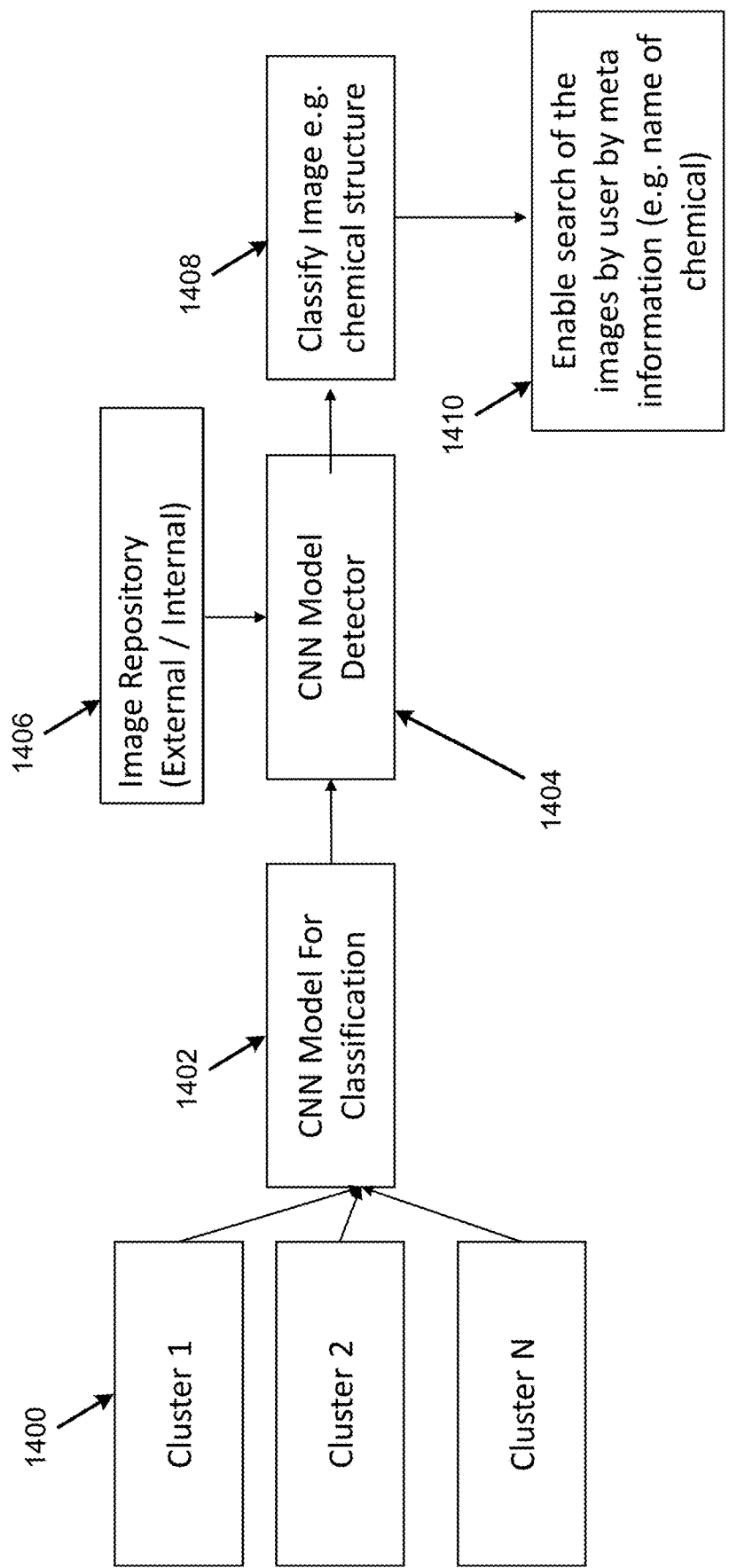
FIG. 14 illustrates implementation of a convolutional neural network (CNN) to illustrate operation of the dark web content analysis and identification apparatus of FIG. 1 in accordance with an example of the present disclosure.

FIG. 14 illustrates implementation of a convolutional neural network (CNN) to illustrate operation of apparatus 100 in accordance with an example of the present disclosure.

Referring to FIGS. 3 and 14, with respect to the supervised deep learning implemented for classification at 408 of FIG. 4, as shown in FIG. 14, another use case may include classification of images into categories based on a type of image (e.g., images containing drugs, chemical formula, mushroom, etc.). In this regard, the CNN model may be trained on sample images (e.g., using clusters that contain specific images of interest). For example, at 1400, clusters including cluster-1, cluster-2, ..., cluster-N, may be used to train, at 1402, the CNN model for classification. In this regard, at 1404, the CNN model for classification may be executed on all the webpages (e.g., external data), and internal evidence images at 1406 to make the CNN model searchable. Based on image classification at 1408, this may allow for users to search (e.g., at 1410) for specific information from the data (e.g., identify websites and/or evidence where a particular precursor chemical was sold).

FIGS. 15-17 respectively illustrate an example block diagram 1500, a flowchart of an example method 1600, and a further example block diagram 1700 for dark web content analysis and identification, according to examples. The block diagram 1500, the method 1600, and the block diagram 1700 may be implemented on the apparatus 100 described above with reference to FIG. 1 by way of example and not of limitation. The block diagram 1500, the method 1600, and the block diagram 1700 may be practiced in other apparatus. In addition to showing the block diagram 1500, FIG. 15 shows hardware of the apparatus 100 that may execute the instructions of the block diagram 1500. The hardware may include a processor 1502, and a memory 1504 storing machine readable instructions that when executed by the processor cause the processor to perform the instructions of the block diagram 1500. The memory 1504 may represent a non-transitory computer readable medium. FIG. 16 may represent an example method for dark web content analysis and identification, and the steps of the method. FIG. 17 may represent a non-transitory computer readable medium 1702 having stored thereon machine readable instructions to provide dark web content analysis and identification according to an example. The machine readable instructions, when executed, cause a processor 1704 to perform the instructions of the block diagram 1700 also shown in FIG. 17.

The processor 1502 of FIG. 15 and/or the processor 1504 of FIG. 15 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1702 of FIG. 17), such as hardware storage devices (e.g., RAM (random access memory), ROM (read only memory), EPROM (erasable, programmable ROM), EEPROM (electrically erasable, programmable ROM), hard drives, and flash memory). The memory 1504 may include a RAM, where the machine readable instructions and data for a processor may reside during runtime.

Referring to FIGS. 1-15, and particularly to the block diagram 1500 shown in FIG. 15, the memory 1504 may include instructions 1506 to ascertain data 104 that includes text 106 and images 108.

The processor 1502 may fetch, decode, and execute the instructions 1508 to analyze the ascertained data 104 by performing deep learning based text and image processing on the ascertained data 104 to extract text embedded in the images 108.

The processor 1502 may fetch, decode, and execute the instructions 1510 to analyze the ascertained data 104 by performing deep embedded clustering with respect to the ascertained text 106, the images 108, and the text extracted from the images 108 to generate a plurality of clusters 112.

The processor 1502 may fetch, decode, and execute the instructions 1512 to ascertain clusters, from the plurality of generated clusters 112, that are to be monitored.

The processor 1502 may fetch, decode, and execute the instructions 1514 to ascertain further data that is to be analyzed.

The processor 1502 may fetch, decode, and execute the instructions 1516 to determine whether the ascertained data is sufficient for classification.

Based on a determination that the ascertained data is not sufficient for classification, the processor 1502 may fetch, decode, and execute the instructions 1518 to utilize a deep convolutional generative adversarial networks (DCGAN) based detector 118 to analyze the further data with respect to the ascertained clusters.

Based on a determination that the ascertained data is sufficient for classification, the processor 1502 may fetch, decode, and execute the instructions 1520 to utilize a convolutional neural network (CNN) based detector 120 to analyze the further data with respect to the ascertained clusters.

The processor 1502 may fetch, decode, and execute the instructions 1522 to control, based on the analysis of the further data, an operation associated with a website related to the further data.

Referring to FIGS. 1-14 and 16, and particularly FIG. 16, for the method 1600, at block 1602, the method may include ascertaining, by at least one hardware processor, data 104 that includes text 106 and images 108.

At block 1604, the method may include analyzing, by the at least one hardware processor, the ascertained data 104 by performing deep learning based text and image processing on the ascertained data 104 to extract text embedded in the images 108.

At block 1606, the method may include analyzing, by the at least one hardware processor, the ascertained data 104 by performing deep embedded clustering with respect to the ascertained text 106, the images 108, and the text extracted from the images 108 to generate a plurality of clusters 112.

At block 1608, the method may include training, by the at least one hardware processor and based on the plurality of generated clusters 112, a deep convolutional generative adversarial networks (DCGAN) based detector 118 and a convolutional neural network (CNN) based detector 120.

At block 1610, the method may include ascertaining, by the at least one hardware processor, clusters, from the plurality of generated clusters 112, that are to be monitored.

At block 1612, the method may include ascertaining, by the at least one hardware processor, further data that is to be analyzed.

At block 1614, the method may include determining, by the at least one hardware processor, whether the ascertained data is sufficient for classification.

At block 1616, based on a determination that the ascertained data is not sufficient for classification, the method may include utilizing, by the at least one hardware processor, the DCGAN based detector 118 to analyze the further data with respect to the ascertained clusters.

At block 1618, based on a determination that the ascertained data is sufficient for classification, the method may include utilizing, by the at least one hardware processor, the CNN based detector 120 to analyze the further data with respect to the ascertained clusters.

At block 1620, the method may include controlling, by the at least one hardware processor and based on the analysis of the further data, an operation associated with a website related to the further data.

Referring to FIGS. 1-14 and 17, and particularly FIG. 17, for the block diagram 1700, the non-transitory computer readable medium 1702 may include instructions 1706 to ascertain data 104 that includes text 106 and images 108.

The processor 1704 may fetch, decode, and execute the instructions 1706 to analyze the ascertained data 104 by performing deep learning based text and image processing on the ascertained data 104 to extract text embedded in the images 108.

The processor 1704 may fetch, decode, and execute the instructions 1710 to analyze the ascertained data 104 by performing deep embedded clustering with respect to the ascertained text 106, the images 108, and the text extracted from the images 108 to generate a plurality of clusters 112.

The processor 1704 may fetch, decode, and execute the instructions 1712 to ascertain clusters, from the plurality of generated clusters 112, that are to be monitored.

The processor 1704 may fetch, decode, and execute the instructions 1714 to ascertain further data that is to be analyzed.

The processor 1704 may fetch, decode, and execute the instructions 1716 to determine whether the ascertained data is sufficient for classification.

Based on a determination that the ascertained data is not sufficient for classification, the processor 1704 may fetch, decode, and execute the instructions 1718 to utilize a deep convolutional generative adversarial networks (DCGAN) based detector 118 to analyze the further data with respect to the ascertained clusters.

Based on a determination that the ascertained data is sufficient for classification, the processor 1704 may fetch, decode, and execute the instructions 1720 to utilize a convolutional neural network (CNN) based detector 120 to analyze the further data with respect to the ascertained clusters by utilizing the CNN based detector 120 to analyze the further data to score the further data.

The processor 1704 may fetch, decode, and execute the instructions 1722 to control, based on the analysis of the further data, an operation associated with a website related to the further data.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A dark web content analysis and identification apparatus comprising:
    a data receiver, executed by at least one hardware processor, to
        ascertain data that includes text and images;
    a deep learning based data analyzer, executed by the at least one hardware processor, to
        analyze the ascertained data by performing
            deep learning based text and image processing on the ascertained data to extract text embedded in the images, and
            deep embedded clustering with respect to the ascertained text, the images, and the text extracted from the images to generate a plurality of clusters;
    a data enricher, executed by the at least one hardware processor, to
        ascertain clusters, from the plurality of generated clusters, that are to be monitored;
    an intelligence applicator, executed by the at least one hardware processor, to
        ascertain further data that is to be analyzed,
        determine whether the ascertained data is sufficient for classification,
        based on a determination that the ascertained data is not sufficient for classification, utilize a deep convolutional generative adversarial networks (DCGAN) based detector to analyze the further data with respect to the ascertained clusters, and
        based on a determination that the ascertained data is sufficient for classification, utilize a convolutional neural network (CNN) based detector to analyze the further data with respect to the ascertained clusters; and
    an insights based controller, executed by the at least one hardware processor, to
        control, based on the analysis of the further data, an operation associated with a website related to the further data.

2. The dark web content analysis and identification apparatus according to claim 1, wherein the deep learning based data analyzer is executed by the at least one hardware processor to analyze the ascertained data by performing deep embedded clustering with respect to the ascertained text, the images, and the text extracted from the images to generate the plurality of clusters by:
    analyzing, for the ascertained text and the text extracted from the images, combine continuous bag of words (CBOW) based similarity;
    analyzing, for the ascertained images, convolutional neural network (CNN) based similarity; and
    generating, based on the CBOW based similarity and the CNN based similarity, the plurality of clusters.

3. The dark web content analysis and identification apparatus according to claim 1, wherein, based on the determination that the ascertained data is not sufficient for classification, the intelligence applicator is executed by the at least one hardware processor to utilize the DCGAN based detector to analyze the further data with respect to the ascertained clusters by:
    utilizing the DCGAN based detector to analyze the further data with respect to the ascertained clusters to identify a similar source with respect to the further data.

4. The dark web content analysis and identification apparatus according to claim 3, wherein the intelligence applicator is executed by the at least one hardware processor to utilize the DCGAN based detector to analyze the further data with respect to the ascertained clusters to identify the similar source with respect to the further data by:
    utilizing the DCGAN based detector to analyze the further data with respect to the ascertained clusters to identify the similar source that includes a similar website with respect to the further data.

5. The dark web content analysis and identification apparatus according to claim 4, wherein the intelligence applicator is executed by the at least one hardware processor to utilize the DCGAN based detector to analyze the further data with respect to the ascertained clusters to identify the similar source that includes the similar website with respect to the further data by:
    determining the similarity of the similar website with respect to the further data based on at least one of a similarity of images included in the similar website, or a similarity of an organization of the similar website.

6. The dark web content analysis and identification apparatus according to claim 1, wherein, based on the determination that the ascertained data is sufficient for classification, the intelligence applicator is executed by the at least one hardware processor to utilize the CNN based detector to analyze the further data with respect to the ascertained clusters by:

utilizing the CNN based detector to analyze the further data to score the further data.

7. The dark web content analysis and identification apparatus according to claim 1, wherein the insights based controller is executed by the at least one hardware processor to control, based on the analysis of the further data, the operation associated with the website related to the further data by:

blocking access to the website related to the further data.

8. The dark web content analysis and identification apparatus according to claim 1, wherein the insights based controller is executed by the at least one hardware processor to control, based on the analysis of the further data, the operation associated with the website related to the further data by:

generating an alert with respect to the website related to the further data.

9. The dark web content analysis and identification apparatus according to claim 1, wherein the insights based controller is executed by the at least one hardware processor to control, based on the analysis of the further data, the operation associated with the website related to the further data by:

generating, based on at least one of a type or a severity of a corresponding cluster of the ascertained clusters, an alert with respect to the website related to the further data.

10. The dark web content analysis and identification apparatus according to claim 1, wherein the intelligence applicator is executed by the at least one hardware processor to:

train, based on the plurality of generated clusters, the DCGAN based detector to analyze the further data with respect to the ascertained clusters.

11. The dark web content analysis and identification apparatus according to claim 1, wherein the intelligence applicator is executed by the at least one hardware processor to:

train, based on the plurality of generated clusters, the CNN based detector to analyze the further data with respect to the ascertained clusters.

12. A method for dark web content analysis and identification comprising:

ascertaining, by at least one hardware processor, data that includes text and images;

analyzing, by the at least one hardware processor, the ascertained data by performing deep learning based text and image processing on the ascertained data to extract text embedded in the images, and deep embedded clustering with respect to the ascertained text, the images, and the text extracted from the images to generate a plurality of clusters;

training, by the at least one hardware processor and based on the plurality of generated clusters, a deep convolutional generative adversarial networks (DCGAN) based detector and a convolutional neural network (CNN) based detector;

ascertaining, by the at least one hardware processor, clusters, from the plurality of generated clusters, that are to be monitored;

ascertaining, by the at least one hardware processor, further data that is to be analyzed;

determining, by the at least one hardware processor, whether the ascertained data is sufficient for classification;

based on a determination that the ascertained data is not sufficient for classification, utilizing, by the at least one hardware processor, the DCGAN based detector to analyze the further data with respect to the ascertained clusters;

based on a determination that the ascertained data is sufficient for classification, utilizing, by the at least one hardware processor, the CNN based detector to analyze the further data with respect to the ascertained clusters; and controlling, by the at least one hardware processor and based on the analysis of the further data, an operation associated with a website related to the further data.

13. The method according to claim 12, wherein analyzing, by the at least one hardware processor, the ascertained data by performing deep embedded clustering with respect to the ascertained text, the images, and the text extracted from the images to generate the plurality of clusters further comprises:

analyzing, for the ascertained text and the text extracted from the images, combine continuous bag of words (CBOW) based similarity;

analyzing, for the ascertained images, CNN based similarity; and generating, based on the CBOW based similarity and the CNN based similarity, the plurality of clusters.

14. The method according to claim 12, wherein, based on the determination that the ascertained data is not sufficient for classification, utilizing, by the at least one hardware processor, the DCGAN based detector to analyze the further data with respect to the ascertained clusters further comprises:

utilizing the DCGAN based detector to analyze the further data with respect to the ascertained clusters to identify a similar source with respect to the further data.

15. The method according to claim 14, wherein utilizing the DCGAN based detector to analyze the further data with respect to the ascertained clusters to identify the similar source with respect to the further data further comprises:

utilizing the DCGAN based detector to analyze the further data with respect to the ascertained clusters to identify the similar source that includes a similar website with respect to the further data.

16. The method according to claim 15, wherein utilizing the DCGAN based detector to analyze the further data with respect to the ascertained clusters to identify the similar source that includes the similar website with respect to the further data further comprises:

determining the similarity of the similar website with respect to the further data based on at least one of a similarity of images included in the similar website, or a similarity of an organization of the similar website.

17. A non-transitory computer readable medium having stored thereon machine readable instructions, the machine readable instructions, when executed by at least one hardware processor, cause the at least one hardware processor to:

ascertain data that includes text and images;

analyze the ascertained data by performing deep learning based text and image processing on the ascertained data to extract text embedded in the images, and deep embedded clustering with respect to the ascertained text, the images, and the text extracted from the images to generate a plurality of clusters;

ascertain clusters, from the plurality of generated clusters, that are to be monitored;

ascertain further data that is to be analyzed;

determine whether the ascertained data is sufficient for classification;

based on a determination that the ascertained data is not sufficient for classification, utilize a deep convolutional generative adversarial networks (DCGAN) based detector to analyze the further data with respect to the ascertained clusters;

based on a determination that the ascertained data is sufficient for classification, utilize a convolutional neural network (CNN) based detector to analyze the further data with respect to the ascertained clusters by utilizing the CNN based detector to analyze the further data to score the further data; and control, based on the analysis of the further data, an operation associated with a website related to the further data.

18. The non-transitory computer readable medium according to claim 17, wherein the machine readable instructions to control, based on the analysis of the further data, the operation associated with the website related to the further data, when executed by the at least one hardware processor, further cause the at least one hardware processor to:

block access to the website related to the further data.

19. The non-transitory computer readable medium according to claim 17, wherein the machine readable instructions to control, based on the analysis of the further data, the operation associated with the website related to the further data, when executed by the at least one hardware processor, further cause the at least one hardware processor to:

generate an alert with respect to the website related to the further data.

20. The non-transitory computer readable medium according to claim 17, wherein the machine readable instructions to control, based on the analysis of the further data, the operation associated with the website related to the further data, when executed by the at least one hardware processor, further cause the at least one hardware processor to:

generate, based on at least one of a type or a severity of a corresponding cluster of the ascertained clusters, an alert with respect to the website related to the further data.

* * * * *